US012762201B2

(12) United States Patent
Gokmen et al.

(10) Patent No.: US 12,762,201 B2
(45) Date of Patent: Oct. 13, 2026

(54) CALIBRATION OF MATRIX-VECTOR OPERATIONS ON RESISTIVE PROCESSING UNIT HARDWARE

(71) Applicant: International Business Machines Corporation, Armonk, NY (US)

(72) Inventors: Tayfun Gokmen, Briarcliff Manor, NY (US); Yasuteru Kohda, Yamato (JP); Effendi Leobandung, Stormville, NY (US); Kohji Hosokawa, Ohtsu (JP); Paul Michael Solomon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 17/555,618

(22) Filed: Dec. 20, 2021

(65) Prior Publication Data

US 2023/0195832 A1 Jun. 22, 2023

(51) Int. Cl.
*G06F 17/16* (2006.01)
*G06F 7/544* (2006.01)
(Continued)

(52) U.S. Cl.
CPC ............ *G06F 17/16* (2013.01); *G06F 7/5443* (2013.01); *G06N 3/065* (2023.01); *G06N 3/084* (2013.01)

(58) Field of Classification Search
CPC ...................................................... G06F 7/5443
See application file for complete search history.

(56) References Cited

U.S. PATENT DOCUMENTS 10,360,283 B2 7/2019 Gokmen et al.
10,381,074 B1 8/2019 Kim et al.
(Continued)

OTHER PUBLICATIONS

S. R. Nandakumar, M. Le Gallo, I. Boybat, B. Rajendran, A. Sebastian and E. Eleftheriou, "Mixed-precision architecture based on computational memory for training deep neural networks," 2018 IEEE International Symposium on Circuits and Systems (ISCAS), Florence, Italy, 2018, pp. 1-5. (Year: 2018).*
(Continued)

*Primary Examiner* — Emily E Larocque
*Assistant Examiner* — Markus Anthony Villanueva
(74) *Attorney, Agent, or Firm* — Kimberly Zillig; Ryan, Mason & Lewis, LLP

(57) ABSTRACT

A system comprises a processor, and a resistive processing resistive processing unit coupled to the processor. The resistive processing unit comprises an array of cells, wherein the cells respectively comprise resistive memory devices, wherein at least a portion of the resistive memory devices are programmable to store weight values of a given matrix in the array of cells. The processor is configured to store the given matrix in the array of cells of the resistive processing unit, and perform a calibration process to generate a first set of calibration parameters for calibrating forward pass matrix-vector multiplication operations performed on the stored matrix in the array of cells of the resistive processing unit, and a second set of calibration parameters for calibrating backward pass matrix-vector multiplication operations performed on a transpose of the stored matrix in the array of cells of the resistive processing unit.

20 Claims, 12 Drawing Sheets

(51) Int. Cl.
*G06N 3/065* (2023.01)
*G06N 3/084* (2023.01)

(56) References Cited

U.S. PATENT DOCUMENTS

| | | | | |
|---|---|---|---|---|
| 10,467,528 | B2 | 11/2019 | Golovashkin et al. | |
| 10,599,744 | B2 | 3/2020 | Gokmen et al. | |
| 10,740,671 | B2 | 8/2020 | Gokmen | |
| 12,099,919 | B2 * | 9/2024 | Lee | G06N 3/0499 |
| 12,547,373 | B2 * | 2/2026 | Shibata | G06F 7/5443 |
| 12,554,975 | B2 * | 2/2026 | Lee | G06F 7/5443 |
| 2019/0122105 | A1 | 4/2019 | Boybat Kara et al. | |
| 2019/0258926 | A1 | 8/2019 | Abel et al. | |
| 2020/0082269 | A1 | 3/2020 | Gao et al. | |
| 2020/0279169 | A1 * | 9/2020 | Hoskins | G06N 3/10 |
| 2020/0349440 | A1 | 11/2020 | Gokmen | |
| 2020/0380349 | A1 | 12/2020 | Rasch et al. | |
| 2021/0073650 | A1 | 3/2021 | Reisser et al. | |
| 2021/0081775 | A1 | 3/2021 | Leobandung et al. | |
| 2021/0097366 | A1 | 4/2021 | Wagner et al. | |
| 2022/0005526 | A1 * | 1/2022 | Hu | G11C 29/10 |
| 2023/0091541 | A1 * | 3/2023 | Yu | H04N 19/186<br>382/279 |
| 2023/0385085 | A1 * | 11/2023 | Singh | G06F 9/451 |
| 2026/0134340 | A1 * | 5/2026 | Dhakal | G06N 20/00 |

OTHER PUBLICATIONS

Gokmen, Tayfun, Murat Onen, and Wilfried Haensch. "Training Deep Convolutional Neural Networks with Resistive Cross-Point Devices." Frontiers in neuroscience 11 (2017) (Year: 2017).*

Afendras, Georgios, and Marianthi Markatou. "Uniform integrability of the OLS estimators, and the convergence of their moments." Test 25 (2018): 775-784. (Year: 2018).*

Precup, Radu. "The role of matrices that are convergent to zero in the study of semilinear operator systems" Math. Comput. Modelling, 49 (2009), pp. 703-708 (Year: 2009).*

Shubham Jain and Anand Raghunathan. 2019. CxDNN: Hardware-software Compensation Methods for Deep Neural Networks on Resistive Crossbar Systems. ACM Trans. Embed. Comput. Syst. 18, 6, Article 113 (Nov. 2019), 23 pages. (Year: 2019).*

V. Joshi et al., "Accurate Deep Neural Network Inference Using Computational Phase-Change Memory," Nature Communications, vol. 11, No. 1, Article 2473, May 18, 2020, pp. 1-13.

S. Jain et al., "CxDNN: Hardware-Sofware Compensation Methods for Deep Neural Networks on Resistive Crossbar Systems," ACM Transactions on Embedded Computing Systems, vol. 18, No. 6, Article 113, Nov. 15, 2019, pp. 113:1-113:23.

J. M. Correll et al., "A Fully Integrated Reprogrammable CMOS-RRAM Compte-In-Memory Coprocessor for Neuromorphic Applications," IEEE Journal on Exploratory Solid-State Computational Devices and Circuits, vol. 6, No. 1, Jun. 2020, pp. 36-44.

S. Jain et al., "RxNN: A Framework For Evaluating Deep Neural Networks On Resistive Crossbars," Cornell University Library, arXiv:1809.00072v3, Jun. 2, 2020, 13 pages.

M. J. Rasch et al., "A Flexible and Fast PyTorch Toolkit for Simulating Training and Inference on Analog Crossbar Arrays," Cornell University Library, arXiv:2104.02184v1, Apr. 5, 2021, 11 pages.

P. Mell et al., "The NIST Definition of Cloud Computing," Recommendations of the National Institute of Standards and Technology, Special Publication 800-145, Sep. 2011, 7 pages.

U.S. Appl. No. 17/340,242 filed in the name of Tayfun Gokmen et al., filed Jun. 7, 2021, and entitled "Extraction of Weight Valves in Resistive Processing Unit Array."

* cited by examiner

400

400

MATRIX-VECTOR MULTIPLY
(BACKWARD PASS)

$$y_{err} = W^T x_{err}$$
$$I = G^T V$$

$$\begin{bmatrix} I_1 \\ I_2 \\ \vdots \\ I_n \end{bmatrix} = \begin{bmatrix} G_{11} & G_{21} & \cdots & G_{m1} \\ G_{12} & G_{22} & \cdots & G_{m2} \\ \vdots & \vdots & \ddots & \vdots \\ G_{1n} & G_{2n} & \cdots & G_{mn} \end{bmatrix} \begin{bmatrix} V_1 \\ V_2 \\ \vdots \\ V_m \end{bmatrix}$$

CALIBRATION OF MATRIX-VECTOR OPERATIONS ON RESISTIVE PROCESSING UNIT HARDWARE

BACKGROUND

This disclosure relates generally to analog resistive processing systems for neuromorphic computing, and techniques for calibrating computations performed on analog resistive processing systems. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of resistive processing unit (RPU) cells having tunable resistive memory devices (e.g., tunable conductance), wherein the conductance states of the RPU cells are encoded or otherwise mapped to the synaptic weights.

SUMMARY

Exemplary embodiments of the disclosure provide techniques for automatically calibrating matrix-vector operations performed on a resistive processing unit system. In an exemplary embodiment, a system comprises a processor, and a resistive processing resistive processing unit coupled to the processor. The resistive processing unit comprises an array of cells, wherein the cells respectively comprise resistive memory devices, wherein at least a portion of the resistive memory devices are programmable to store weight values of a given matrix in the array of cells. The processor is configured to store the given matrix in the array of cells of the resistive processing unit, and perform a calibration process to generate a first set of calibration parameters for calibrating forward pass matrix-vector multiplication operations performed on the stored matrix in the array of cells of the resistive processing unit, and a second set of calibration parameters for calibrating backward pass matrix-vector multiplication operations performed on a transpose of the stored matrix in the array of cells of the resistive processing unit.

Other embodiments will be described in the following detailed description of exemplary embodiments, which is to be read in conjunction with the accompanying figures.

DETAILED DESCRIPTION

Embodiments of the disclosure will now be described in further detail with regard to systems and methods for automatically calibrating matrix-vector operations performed on a resistive processing unit system. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
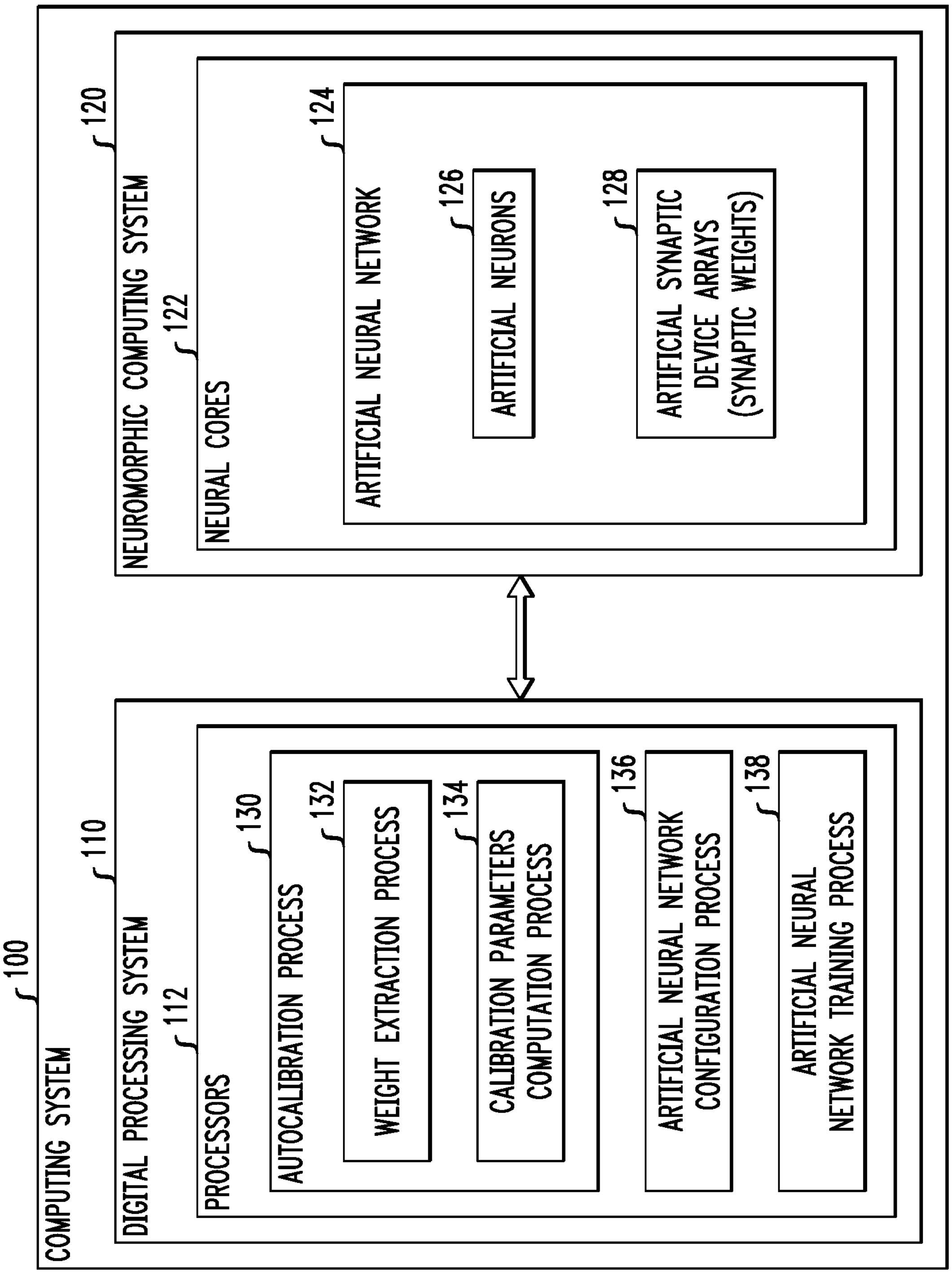
FIG. 1 schematically illustrates a computing system which implements a process for automatically calibrating matrix-vector operations performed on a resistive processing unit system, according to an exemplary embodiment of the disclosure.

FIG. 1 schematically illustrates a computing system which implements a process for automatically calibrating matrix-vector operations performed on an analog resistive processing unit system, according to an exemplary embodiment of the disclosure. In particular, FIG. 1 schematically illustrates a computing system 100 which comprises a digital processing system 110, and a neuromorphic computing system 120. The digital processing system 110 comprises a plurality of processors 112. The neuromorphic computing system 120 comprises a plurality of neural cores 122. The neural cores 122 are configured to implement an artificial neural network 124 which comprises artificial neurons 126, and artificial synaptic device arrays 128. The artificial neural network 124 can be any type of neural network including, but not limited to, a feed-forward neural network (e.g., a Deep Neural Network (DNN), a Convolutional Neural Network (CNN), etc.), a Recurrent Neural Network (RNN) (e.g., a Long Short-Term Memory (LSTM) neural network), etc. In some embodiments, as explained in further detail below, the neuromorphic computing system 120 comprises a system in which the neural cores are implemented using one or more of RPU devices (e.g., RPU chips) and RPU compute nodes, and wherein the artificial synaptic device arrays 128 are implemented using RPU arrays in which synaptic weights are encoded using multi-level non-volatile resistive memory devices.

In general, the artificial neural network 124 comprises a plurality of layers which comprise the artificial neurons 126, wherein the layers include an input layer, an output layer, and one or more hidden model layers between the input and output layers. Each layer is connected to another layer using an array of artificial synaptic devices which provide synaptic weights that represent connection strengths between artificial neurons in one layer with the artificial neurons in another layer. The input layer of the artificial neural network 124 comprises artificial input neurons, which receive initial data that is input to the artificial neural network for further processing by subsequent hidden model layers of artificial neurons. The hidden layers perform various computations, depending on type and framework of the artificial neural network 124. The output layer (e.g., classification layer) implements an activation function and produces the classification/predication results for given inputs.

More specifically, depending on the type of artificial neural network, the layers of the artificial neural network 124 can include functional layers including, but not limited to, fully connected layers, activation layers, convolutional layers, pooling layers, normalization layers, etc. As is known in the art, a fully connected layer in a neural network is a layer in which all the inputs from the layer are connected to every activation unit of the next layer. An activation layer in a neural network comprises activation functions which define how a weighted sum of an input is transformed into an output from a node or nodes in a layer of the network. For example, activation functions include, but are not limited to, a rectifier or ReLU activation function, a sigmoid activation function, a hyperbolic tangent (tanH) activation function, a softmax activation function, etc.

In some embodiments, the digital processing system 110 performs various methods through execution of program code by the processors 112. The processors 112 may include various types of processors that perform processing functions based on software, hardware, firmware, etc. For example, the processors 112 may comprise any number and combination of CPUs, ASICs, FPGAs, GPUs, Microprocessing Units (MPUs), deep learning accelerator (DLA), artificial intelligence (AI) accelerators, and other types of specialized processors or coprocessors that are configured to execute one or more fixed functions. The digital processing system 110 executes various processes including, but not limited to, an autocalibration process 130 (which comprises a weight extraction process 132 and a calibration parameters computation process 134), an artificial neural network configuration process 136, and an artificial neural network training process 138.

The autocalibration process 130 implements methods that are configured to automatically perform a calibration process to generate (i) a first set of calibration parameters for calibrating forward pass matrix-vector multiplication operations performed on a stored matrix in an RPU array, and (ii) a second set of calibration parameters for calibrating backward pass matrix-vector multiplication operations performed on a transpose of the stored matrix in the RPU array. The first and second sets of calibration parameters (alternatively, correction parameters) are applied to forward pass and backward pass matrix-vector multiplications performed by RPU arrays during neural network training operations. The first set of calibration parameters comprises a first set of offset correction parameters, and a first set of scaling correction parameters. The second set of calibration parameters comprises a second set of offset correction parameters, and a second set of scaling correction parameters. The first set and the second set of calibration parameters are utilized to ensure that the encoded weights of a given RPU array are the same or substantially the same for the forward and backward pass training operations despite the existence of non-idealities (e.g., hardware offsets and mismatches) of the RPU system hardware, which would otherwise result in disparities between the encoded weights of a given RPU array for the forward and backward pass training operations.

In some embodiments, the calibration parameters are automatically determined by performing the weight extraction process 132 and the calibration parameters computation process 134. The weight extraction process 132 implements methods that are configured to enable accurate extraction of weight values of a given weight matrix W stored in a given RPU array, despite the non-idealities of the RPU system hardware. More specifically, in some embodiments, the weight extraction process 132 is configured to (i) perform a first weight extraction process to extract an effective forward weight matrix (denoted herein as $W_F$), and (ii) perform a second weight extraction process to extract an effective backward weight matrix (denoted herein as $W_B$). The forward and backward weight matrices $W_F$ and $W_B$ are utilized to determine the first set and the second set of calibration parameters for calibrating forward and backward pass matrix-vector multiplications performed on the given RPU array.

As explained in further detail below, such weight extraction techniques are configured to compute a matrix of effective forward and backward weight values from the RPU hardware, which correspond to the stored weight matrix values of the matrix W and the transpose matrix $W^T$, wherein the computation of the effective forward and backward weight values is configured to compensate for non-idealities associated with the RPU hardware. In effect, the effective forward and backward weight values $W_F$ and $W_B$ characterize the effective behavior of the RPU hardware with respect to, e.g., forward pass and backward pass matrix-vector multiplication operations performed by the RPU hardware on a stored weight matrix W and corresponding transpose matrix $W^T$ in the given RPU array. Exemplary modes of operation of the weight extraction process 132 will be discussed in further detail below in conjunction with, e.g., FIGS. 6A, 6B, and 7.

In some embodiments, as explained in further detail below, the weight extraction process 132 is configured to compute a set of offset correction parameters for forward operations performed on the given RPU array (denoted herein as $O_F$), and a set of offset correction parameters for backward operations performed on the given RPU array (denoted herein as $O_B$). In addition, the calibration parameters computation process 134 utilizes the effective forward and backward weight matrices $W_F$ and $W_B$, which are computed by the weight extraction process 132, to automatically determine scaling calibration parameters. As explained in further detail below, in some embodiments, the calibration parameters computation process 134 implements a multivariate linear regression optimization to compute: $S_F W_F - W_B S_B = 0$, where $S_F$ and $S_B$ each comprise a diagonal matrix (more generally, a scaling matrix). The scaling matrix $S_F$ comprises computed scaling correction parameters which are applied to matrix-vector computations in the forward pass directions, and scaling matrix $S_B$ comprises computed scaling correction parameters which are applied to matrix-vector computations in the backward pass directions. Exemplary modes of operation of the calibration parameters computation process 134 will be discussed in further detail below in conjunction with, e.g., FIGS. 6C and 7.

The artificial neural network configuration process 136 implements methods for configuring the neural cores 122 of the neuromorphic computing system 120 to implement an architecture of an artificial neural network in RPU hardware, which is trained by executing the artificial neural network training process 138. For example, in some embodiments, the artificial neural network configuration process 136 includes methods for configuring the neuromorphic computing system 120 (e.g., RPU system) to perform hardware accelerated computation operations that will be needed to perform a model training process (e.g., the backpropagation process. For example, in some embodiments, the artificial neural network configuration process 136 communicates with a programming interface of the neuromorphic computing system 120 to configure one or more artificial neurons and a routing system of the neuromorphic computing system 120 to allocate and configure one or more neural cores to (i) implement one or more interconnected RPU arrays for storing initial weight matrices, and to (ii) perform in-memory computations (e.g., matrix-vector computations, outer product computations, etc.) needed to implement the training process. Furthermore, in some embodiments, the autocalibration process 130 is configured to operate in conjunction with the artificial neural network configuration process 136 to configure the RPU system to apply the offset correction parameters and the scaling correction parameters, which were computed by the autocalibration process 130, for calibrating forward pass and backward pass matrix-vector multiplication operations that are performed by the RPU system during the training process. The type of training process that is implemented depends on the type and size of the artificial neural network to be trained. Model training methods generally include data parallel training methods (data parallelism) and model parallel training methods (model parallelism), which can be implemented at least in part in the analog domain using a network of interconnected RPU compute nodes.

In some embodiments, the artificial neural network training process 138 implements a backpropagation process for training an artificial neural network. As is known in the art, the backpropagation process comprises three repeating processes including (i) a forward process, (ii) a backward process, and (iii) a model parameter update process. During the digital training process, training data are randomly sampled into mini-batches, and the mini-batches are input to the model to traverse the model in two phases: forward and backward passes. The forward pass generates predictions and calculates errors between the predictions and the ground truth. The backward pass backpropagates errors through the model to obtain gradients to update model weights. The forward and backward cycles mainly involve performing matrix-vector multiplication operations in forward and backward directions. The weight update involves performing incremental weight updates for weight values of the synaptic weight matrices of the neural network model being trained. The processing of a given mini-batch via the forward and backward phases is referred to as an iteration, and an epoch is defined as performing the forward-backward pass through an entire training dataset. The training process iterates multiple epochs until the model converges to a convergence criterion. In some embodiments, a stochastic gradient descent (SGD) process is utilized to train artificial neural networks using the backpropagation method in which an error gradient with respect to each model parameter (e.g., weight) is calculated using the backpropagation algorithm.

Figure 2:
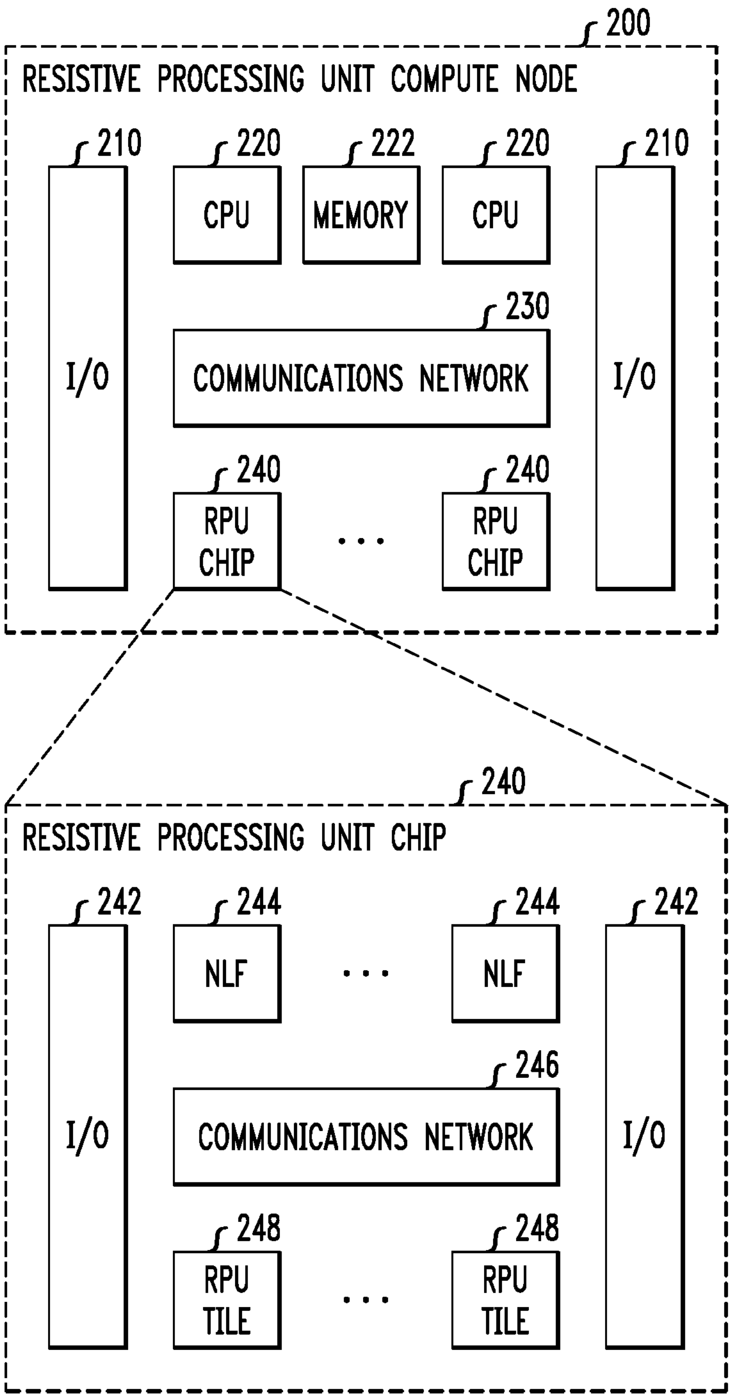
FIG. 2 schematically illustrates a resistive processing unit computing system comprising a plurality of resistive processing unit chips, which can be utilized to implement the computing system of FIG. 1, according to an exemplary embodiment of the disclosure.

In some embodiments, the computing system 100 is implemented using an RPU computing system, an exemplary embodiment of which is shown in FIG. 2. In particular, FIG. 2 schematically illustrates an RPU compute node 200 comprising an I/O interface 210, one or more processors 220 (e.g., CPUs), memory 222 (e.g., volatile memory, and non-volatile memory), a communications network 230, and one or more RPU chips 240. In some embodiments, as shown in FIG. 2, each RPU chip 240 comprises an I/O interface 242, a plurality of non-linear function (NLF) compute modules 244, an intranode communications network 246, and a plurality of RPU tiles 248. The I/O interface 242 comprises circuitry to enable off-chip I/O communication. Each RPU tile 248 comprises an array of RPU cells (or RPU array) and peripheral circuitry. An exemplary embodiment of the RPU tiles 248 will be described in further detail below with reference to FIG. 3. For artificial neural network applications, the signals that are output from an RPU tile are directed to an NLF compute module 244 which calculates either activation functions (i.e., sigmoid, softmax) and their derivatives, as well as arithmetical operations (i.e., multiplication) depending on, e.g., the given layer of the artificial neural network. For example, for neurons in hidden layers, the NLF compute modules 244 may compute a sigmoid activation function. On the other hand, neurons at an output layer, may perform a softmax NLF operation. The intranode communications network 246 enables on-chip communication through a bus or any suitable network-on-chip (NoC) communications framework. In the exemplary embodiment of FIG. 2, the neuronal functionality is implemented by the NLF compute modules 244 using standard CMOS circuitry, while the synaptic functionality is implemented by the RPU tiles 248 which, in some embodiments, comprise densely integrated crossbar arrays of analog resistive memory devices.

Figure 3:
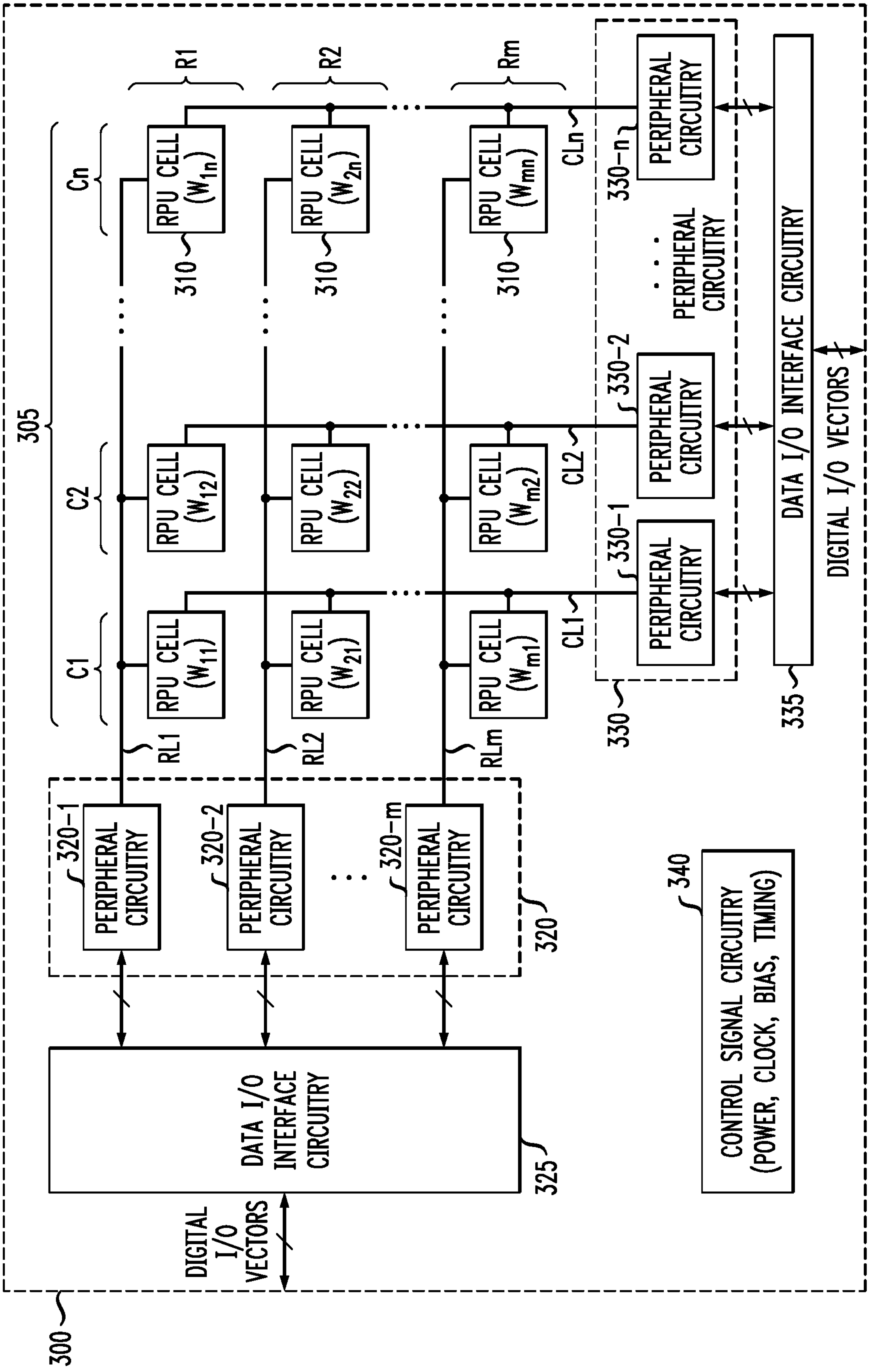
FIG. 3 schematically illustrates an exemplary embodiment of a resistive processing unit system of a resistive processing unit chip, according to an exemplary embodiment of the disclosure.

FIG. 3 schematically illustrates an exemplary embodiment of an RPU system 300 of a resistive processing unit chip, according to an exemplary embodiment of the disclosure. More specifically, in some embodiments, FIG. 3 schematically illustrates an exemplary architecture for implementing each RPU tile 248 of the RPU chip 240 of FIG. 2. As shown in FIG. 3, the RPU system 300 comprises an RPU array 305 (e.g., crossbar array) which comprises RPU cells 310 arranged in a plurality of rows R1, R2, . . . , Rm, and a plurality of columns C1, C2, . . . , Cn. The RPU cells 310 in each row R1, R2, . . . , Rm are commonly connected to respective row control lines RL1, RL2, . . . , RLm (collectively, row control lines RL). The RPU cells 310 in each column C1, C2, . . . , Cn are commonly connected to respective column control lines CL1, CL2, . . . , CLn (collectively, column control lines CL). Each RPU cell 310 is connected at (and between) a cross-point (or intersection) of a respective one of the row and column control lines. In some embodiments, the number of rows (m) and the number of columns (n) are the same (i.e., m=n). For example, in an exemplary non-limiting embodiment, the RPU system 300 comprises a 4,096×4,096 array of RPU cells 310.

The RPU system 300 further comprises peripheral circuitry 320 coupled to the row control lines RL1, RL2, . . . , RLm, as well as peripheral circuitry 330 coupled to the column control lines CL1, CL2, . . . , CLn. More specifically, the peripheral circuitry 320 comprises blocks of peripheral circuitry 320-1, 320-2, . . . , **320-*m* (collectively peripheral circuitry 320) connected to respective row control lines RL1, RL2, . . . , RLm, and the peripheral circuitry 330 comprises blocks of peripheral circuitry 330-1, 330-2, . . . , 330-*n* (collectively, peripheral circuitry 330) connected to respective column control lines CL1, CL2, . . . , CLn. Further, each block of peripheral circuitry 320-1, 320-2, . . . , 320-*m* is connected to data input/output (I/O) interface circuitry 325, and each block of peripheral circuitry 330-1, 330-2, . . . , 330-*n* is connected to data I/O interface circuitry 335. The RPU system 300 further comprises control signal circuitry 340 which comprises various types of circuit blocks such as power, clock, bias and timing circuitry to provide power distribution and control signals and clocking signals for operation of the peripheral circuitry 320 and 330 of the RPU system 300. While the row control lines RL and column control lines CL are each shown in FIG. 3 as a single line for ease of illustration, it is to be understood that each row and column control line can include two or more control lines connected to the RPU cells 310 in the respective rows and columns, depending on the specific architecture of the RPU cells 310**, as is understood by those of ordinary skill in the art.

In some embodiments, each RPU cell 310 in the RPU system 300 comprises a resistive memory element with a tunable conductance. For example, the resistive memory elements of the RPU cells 310 can be implemented using resistive devices such as resistive switching devices (interfacial or filamentary switching devices), ReRAM, memristor devices, phase change memory (PCM) devices, and other types of resistive memory devices having a tunable conductance (or tunable resistance level) which can be programmatically adjusted within a range of a plurality of different conductance levels to tune the values (e.g., matrix values, synaptic weights, etc.) of the RPU cells 310. In some embodiments, the variable conductance elements of the RPU cells 310 can be implemented using ferroelectric devices such as ferroelectric field-effect transistor devices. Furthermore, in some embodiments, the RPU cells 310 can be implemented using an analog CMOS-based framework in which each RPU cell 310 comprises a capacitor and a read transistor. With the analog CMOS-based framework, the capacitor serves as a memory element of the RPU cell 310 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

For certain applications, some or all of the RPU cells 310 within the RPU array 305 comprise respective conductance values that are mapped to respective numerical matrix values of a given matrix W (e.g., computational matrix or synaptic weight matrix, etc.) that is stored in the RPU array 305. For example, for an artificial neural network application, some or all of the RPU cells 310 with the RPU array 305 serve as artificial synaptic devices that are encoded with synaptic weights of a synaptic array which connects two layers of artificial neurons of the artificial neural network. More specifically, in an exemplary embodiment, the RPU array 305 comprises an array of artificial synaptic devices which connect artificial pre-synaptic neurons (e.g., artificial neurons of an input layer or hidden layer of the artificial neural network) and artificial post-synaptic neurons (e.g., artificial neuron of a hidden layer or output layer of the artificial neural network), wherein the artificial synaptic devices provide synaptic weights that represent connection strengths between the pre-synaptic and post-synaptic neurons. As shown in FIG. 3, the weights $W_{ij}$ are in the form of a matrix, wherein i denotes the row index and j denotes the column index. While FIG. 3 shows an exemplary embodiment in which all RPU cells 310 encoded with a given weight value for a weight matrix W with a size of m×n, the RPU array 305 can be configured to store a weight matrix with a size smaller than m×n.

The peripheral circuitry 320 and 330 comprises various circuit blocks that are configured to perform functions such as, e.g., programming the conductance values of the RPU cells 310 to store encoded values (e.g., matrix values, synaptic weights, etc.), reading the programmed states of the RPU cells 310, and performing functions to support analog, in-memory computation operations such as matrix-vector multiply functions, matrix-matrix multiply functions, outer product update operations, etc., as discussed herein. For example, in some embodiments, each block of peripheral circuitry 320-1, 320-2, . . . , **320-*m* comprises corresponding pulse-width modulation (PWM) circuitry and associated driver circuitry, and readout circuitry for each row of RPU cells 310 of the RPU array 305. Similarly, each block of peripheral circuitry 330-1, 330-2, . . . , 330-*n* comprises corresponding PWM circuitry and associated driver circuitry, and readout circuitry for each column of RPU cells 310 of the RPU array 305**.

The PWM circuitry and associated pulse driver circuitry of the peripheral circuitry 320 and 330 is configured to generate and apply PWM read pulses to the rows and columns of the array of RPU cells 310 in response to digital input vector values (read input values) that are received during different operations (e.g., forward pass and backward pass training operations). In some embodiments, the PWM circuitry implements digital-to-analog (D/A) converter circuitry which is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values on the columns (or rows) which are represented by output currents, wherein the output currents are processed by the readout circuitry.

For example, in some embodiments, the readout circuitry of the peripheral circuitry 320 and 330 comprises current integrator circuitry and analog-to-digital (A/D) converter circuitry to integrate read currents ($I_{READ}$) which are output and accumulated from the rows and columns of connected RPU cells 310 and convert the integrated currents into digital values (read output values) for subsequent computation. In particular, the currents generated by the RPU cells 310 are summed on the columns (or rows) and the summed current is integrated over a measurement time, tmeas, by the readout circuitry of the peripheral circuitry 320 and 330. In some embodiments, each current integrator comprises an operational amplifier that integrates the current output from a given column (or row) (or differential currents from pairs of RPU cells implementing negative and positive weights) on a capacitor, and an analog-to-digital (A/D) converter that converts the integrated current (e.g., an analog value) to a digital value.

The data I/O interface circuitry 325 and 335 are configured to interface with digital processing cores, wherein the digital processing cores are configured to process digital I/O vectors to the RPU system 300 and route data between different RPU arrays. The data I/O interface circuitry 325 and 335 are configured to receive external control signals and data from digital processing cores and provide the received control signals and data to the peripheral circuitry 320 and 330, receive digital read output values from peripheral circuitry 320 and 330, and send the digital read output values to a digital processing core for processing. In some embodiments, the digital processing cores implement non-linear function circuitry which calculates activation functions (e.g., sigmoid neuron function, softmax, etc.) and other arithmetical operations on data that is to be provided to a next or previous layer of an artificial neural network.

In some embodiments, the RPU system 300 comprises noise and bound management circuitry which is configured to dynamically condition (e.g., via scaling) input vectors and output vectors to overcome issues related to noise and signal saturation when performing analog matrix-vector multiplication operations on an RPU array. In some embodiments, the data I/O interface circuitry 325 and 335 implement noise and bound management circuitry. For example, an input vector having digital values which are relatively small can be scaled up by the noise and bound management circuitry before performing a matrix-vector multiplication operation on the RPU array. The scaling up of the input vector values prevents the output signals that are generated as a result of vector-matrix multiplication operation from being too small and not readily detectable or quantizable in instances where the readout circuitry is configured with an output signal bound (e.g., operating signal range) which is not optimal for processing small signals outside the operating signal range. For instance, the output signal bound is a result of the current integrator circuits of the readout circuitry having fixed size integration capacitors, or the ADC circuits of the readout circuitry having a fixed ADC resolution, etc. In such instances, the analog output signals that are relatively small (e.g., close to zero) will be quantized to zero because of the finite ADC resolution.

Moreover, an input vector having digital values which are relatively large can be scaled down by the noise and bound management circuitry before performing a matrix-vector multiplication operation on the RPU array. The scaling down of the digital values of the input vector prevents saturation of the readout circuitry. In particular, the output signals generated by the matrix-vector multiplication operations include analog voltages which are bounded by signal range limits imposed by the readout circuitry. In particular, the readout circuitry is bounded in a given signal range, $-\beta, \ldots, \beta$, as a result of (i) a saturation voltage of the operational amplifiers of the current integrator circuits (wherein a gain of the current integrator circuits is based on the size of the integration capacitors), and/or (ii) the ADC resolution and/or gain of the ADC circuits of the readout circuitry. In this regard, scaling down the values of the input digital input signals can prevent saturation of the readout circuitry by ensuring that matrix-vector compute results of the RPU system are within the range of an acceptable voltage swing, thus overcoming the bound problem.

In some RPU configurations, the noise and bound management circuitry implements dynamic schemes in which input and output scaling parameters are dynamically computed, during runtime, based on, e.g., maximum values of the digital input vectors. In some embodiments, the noise and bound management circuitry implements the dynamic schemes disclosed in U.S. Ser. No. 15/838,992, filed Dec. 12, 2017, entitled "Noise and Bound Management for RPU Array," which is now U.S. Pat. No. 10,360,283, which is commonly assigned, and the disclosure of which is incorporated herein by reference. Such dynamic schemes are typically used in instances where the analog RPU system is configured to analog computations that are needed for training an artificial neural network, wherein the input vectors for forward pass operations can be relatively large, and wherein the input error vectors for backward pass operations can be relatively small.

For training an artificial neural network using RPU hardware, the RPU system 300 can be configured to perform a backpropagation training process which, as noted above, includes multiple iterations of (i) a forward pass operation, (ii) a backward pass operation, and (iii) a synaptic weight update operation. During the training process, batches of training data are input to the artificial neural network to traverse the neural network in two phases: forward and backward passes. The forward pass operation generates predictions and calculates errors between the predictions and the ground truth. The backward pass operation backpropagates errors through the model to obtain gradients to update model weights. The forward pass and backward pass operations mainly involve performing matrix-vector multiplication operations in forward and backward directions. The synaptic weight update operation involves performing incremental updates of synaptic weight values of synaptic weight matrices of the artificial neural network being trained.

Exemplary methods for configuring the RPU system 300 to perform forward pass and backward pass operations for training an artificial neural network will now be discussed in further detail with regard to the exemplary embodiments of FIGS. 4A and 4B. In particular, FIG. 4A schematically illustrates a method for configuring an RPU system 400 to perform a forward pass operation by performing an analog matrix-vector multiplication operation on a synaptic weight matrix stored in an RPU array, according to an exemplary embodiment of the disclosure, while FIG. 4B schematically illustrates a method for configuring the RPU system 400 to perform a backward pass operation by performing an analog matrix-vector multiplication operation on a transpose of the synaptic weight matrix stored in the RPU array 405, according to an exemplary embodiment of the disclosure.

Figure 4A:
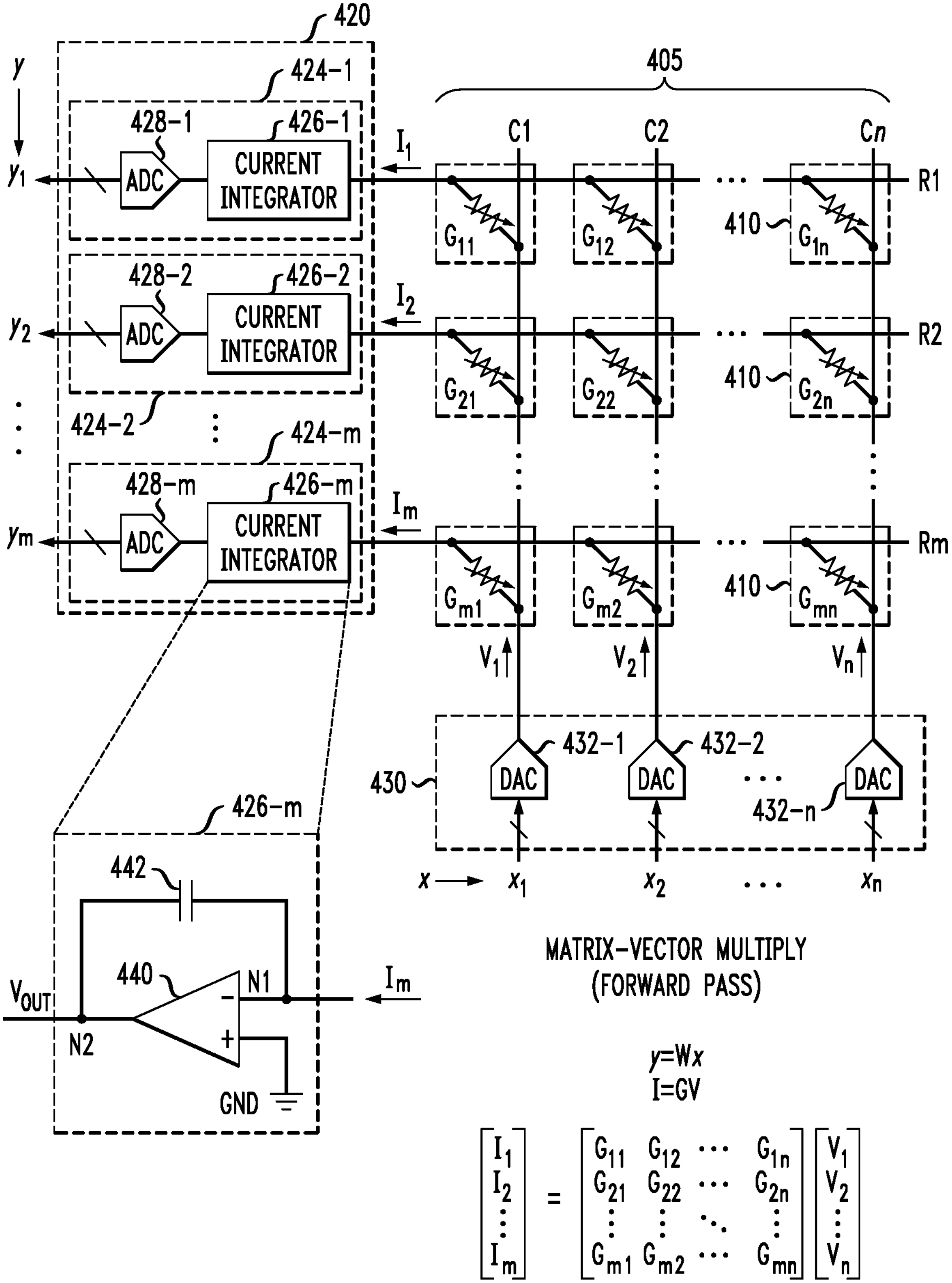
FIG. 4A schematically illustrates a method for configuring a resistive processing unit system to perform a forward pass matrix-vector multiplication operation on a weight matrix stored in a resistive processing unit array, according to an exemplary embodiment of the disclosure.
Figure 4B:
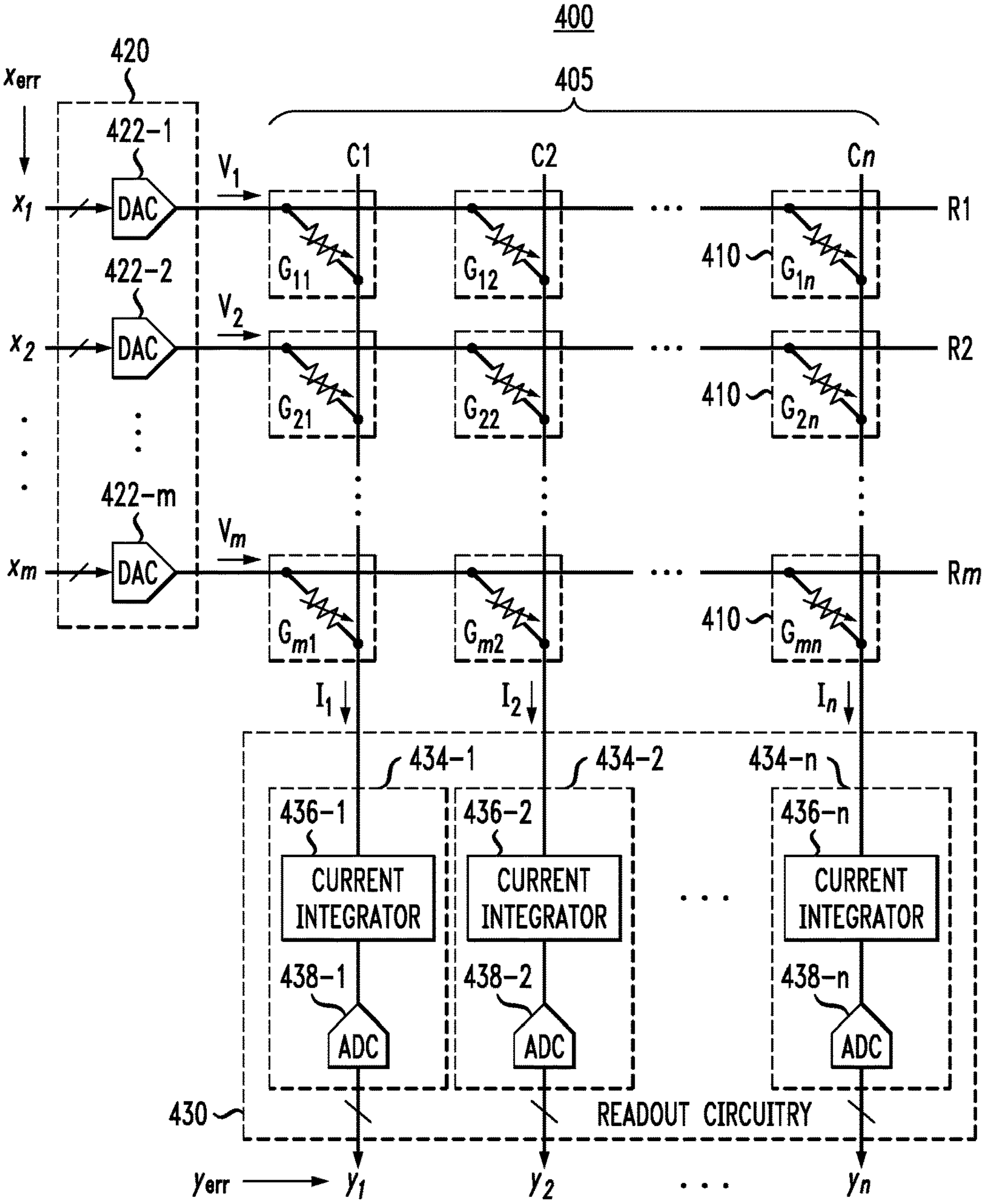
FIG. 4B schematically illustrates a method for configuring a resistive processing unit system to perform a backward pass matrix-vector multiplication operation on a transpose of a weight matrix stored in a resistive processing unit array, according to an exemplary embodiment of the disclosure.

As shown in FIGS. 4A and 4B, the RPU system 400 comprises an RPU array 405 comprising a 2D array of RPU cells 410, peripheral circuitry 420 coupled to each row R1, R2, . . . , Rm of RPU cells 410 of the RPU array 405, and peripheral circuitry 430 coupled to each column C1, C2, . . . , Cn of RPU cells 410 of the RPU array 405. Each RPU cell 410 comprises an analog non-volatile resistive memory element (which is represented as a variable resistor having a tunable conductance G) at the intersection of each row R1, R2, . . . , Rm and column C1, C2, . . . , Cn of the RPU array 405. As depicted in FIG. 4A, the RPU array 405 comprises a conductance matrix G comprising conductance values $G_{ij}$, where i represents a row index and j denotes a column index. For purposes of illustration, it is assumed that the RPU array 405 comprises a synapse array (or connectivity matrix) of synaptic weights for fully connected layers of an artificial neural network in which n artificial neurons (of an input layer, or a hidden layer, etc.) are connected to each of m artificial neurons (of an output layer, or next downstream hidden layer, etc.). The conductance values $G_{ij}$ are mapped to synaptic weights $W_{ij}$ of a given synaptic weight matrix W stored in the RPU array 405, wherein each synaptic weight $W_{ij}$ (encoded by a given conductance value $G_{ij}$) represents a strength of a connection between two artificial neurons of different layers of the artificial neural network.

As collectively shown in FIGS. 4A and 4B, the peripheral circuitry 420 comprises row DAC circuits 422-1, 422-2, . . . , 422-*m* (collectively, row DAC circuits 422), and row readout circuits 424-1, 424-2, . . . 424-*m* (collectively, row readout circuits 424), which are selectively connected to respective rows R1, R2, . . . , Rm of RPU cells 410 of the RPU array 405. Similarly, the peripheral circuitry 430 comprises column DAC circuits 432-1, 432-2, . . . , 432-*n* (collectively, column DAC circuits 432), and column readout circuits 434-1, 434-2, . . . 434-*n* (collectively, column readout circuits 434), which are selectively connected to respective columns C1, C2, . . . , Cn of RPU cells 410 of the RPU array 405. As further shown in FIG. 4A, the row readout circuits 424-1, 424-2, . . . 424-*m* comprise respective current integrator circuits 426-1, 426-2, . . . , 426-*m*, and respective ADC circuits 428-1, 428-2, . . . , 428-*m*. Similarly, as shown in FIG. 4B, the column readout circuits 434-1, 434-2, . . . 434-*n* comprise respective current integrator circuits 436-1, 436-2, . . . , 436-*n*, and respective ADC circuits 438-1, 438-2, . . . , 438-*n*.

As further schematically shown in FIG. 4A for illustrative purposes, the current integrator circuit 426-*m* comprises an operational amplifier 440 (e.g., operational transconductance amplifier (OTA)), and an integrating capacitor 442. The integrating capacitor 442 is connected in a negative feedback path between input and output nodes N1 and N2 of the operational amplifier 440. The operational amplifier 440 comprises a non-inverting input connected to ground (GND) voltage, an inverting input (denoted node N1) coupled to an output of the row line Rm, and an output (denoted node N2) connected to an input of the ADC circuit 428-*m*. The integrating capacitor 442 provides negative capacitive feedback to allow the operational amplifier 440 to convert an input current (e.g., row current $I_m$) to an output voltage VOUT on the output node N2. More specifically, the current integrator circuit 426-*m* performs an integration operation over an integration period ($T_{MEAS}$) to convert an input current at the input node N1 of the current integrator circuit 426-*m* to an analog voltage $V_{OUT}$ at the output node N2 of the current integrator circuit 426-*m*. At the end of an integration period, the ADC circuit 428-*m* latches in the output voltage $V_{OUT}$ generated at the output node N2, and quantizes the output voltage $V_{OUT}$ to generate a digital output signal. It is to be noted that each current integrator circuit shown in FIGS. 4A and 4B implements the same framework as the current integrator circuit 426-*m*. It is to be further noted that the ADC circuits shown in FIGS. 4A and 4B can be implemented using any suitable type of ADC framework. In some embodiments, the ADC circuits are implemented using integrating ADC circuitry, such that the current integrator circuits shown in FIGS. 4A and 4B are integrated within the ADC circuitry.

The peripheral circuitry 420 and 430 comprises switching circuitry (not specifically shown in FIGS. 4A and 4B) which is configured to selectively connect the DAC circuits or readout circuits to the rows and columns of the RPU array 405 depending on the given cycle (e.g., forward pass operation, backward pass operation, weight update operation) of the backpropagation training process. More specifically, FIG. 4A schematically illustrates an exemplary configuration of the RPU system 400 to perform a forward pass operation of a backpropagation training process. The RPU system 400 in FIG. 4A is configured by controlling switching circuitry in the peripheral circuitry 420 and 430 to (i) selectively connect the row readout circuits 424-1, 424-2, . . . 424-*m* of the peripheral circuitry 420 to the respective rows R1, R2, . . . , Rm of the RPU array 405, and to (ii) selectively connect the column DAC circuits 432-1, 432-2, . . . , 432-*n* of the peripheral circuitry 430 to the respective columns C1, C2, . . . , Cn of the RPU array 405.

In the exemplary configuration of FIG. 4A, assuming a given weight matrix W is mapped to a conductance matrix G and stored in the RPU array 405 such that the $i^{th}$ row of RPU cells 410 represents the $i^{th}$ row of the stored weight matrix W, and the $j^{th}$ column of RPU cells 410 represents the $j^{th}$ column of the stored weight matrix W, a matrix-vector multiplication process y=Wx is performed by inputting a digital vector $x=[x_1, x_2, \ldots, x_n]$ to the columns of the RPU array 405. More specifically, the digital signals $x_1, x_2, \ldots, x_n$ are input to respective column DAC circuits 432-1, 432-2, . . . , 432-*n* which generate analog voltages $V_1, V_2, \ldots, V_n$ at the input to the respective column lines C1, C2, . . . , Cn, which are proportional to the input vector values $x_1, x_2, \ldots, x_n$, respectively. In some embodiments, the column DAC circuits 432-1, 432-2, . . . , 432-*n* are configured to implement pulse-width modulation circuitry and driver circuitry which is configured to generate pulse-width modulated (PWM) read pulses $V_1, V_2, \ldots, V_n$ that are applied to the respective column lines C1, C2, . . . , Cn.

More specifically, in some embodiments, as noted above, the column DAC circuits 432-1, 432-2, . . . , 432-*n* are configured to perform a digital-to-analog conversion process using a time-encoding scheme where the elements $x_1, x_2, \ldots, x_n$ of the input vector x are represented by fixed amplitude pulses (e.g., V=1V) with a tunable duration, wherein the pulse duration is a multiple of a prespecified time period (e.g., 1 nanosecond) and is proportional to the value of the elements $x_1, x_2, \ldots, x_n$ of the input vector x. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time $T_{meas}$ of the readout circuitry).

To perform a matrix-vector multiplication, the analog input voltages $V_1, V_2, \ldots, V_n$ (e.g., pulses), are applied to the column lines C1, C2, . . . , Cn, wherein each RPU cell 410 generates a corresponding read current $I_{READ}=V_j \times G_{ij}$ (based on Ohm's law), wherein $V_j$ denotes the analog input voltage applied to the given RPU cell 410 on the given column j and wherein Gij denotes the conductance value of the given RPU cell 410 (at the given row i and column j). As shown in FIG. 4A, the read currents that are generated by the RPU cells 410 on each row i are summed together (based on Kirchhoff's current law) to generate respective currents $I_1, I_2, \ldots, I_m$ at the output of the respective rows R1, R2, . . . , Rm. In this manner, the resulting row currents $I_1, I_2, \ldots, I_m$ represent the result of a matrix-vector multiplication operation that is performed, wherein the matrix W (which is represented by the conductance matrix G of conductance values Gij) is multiplied by the input analog voltage vector $[V_1, V_2, \ldots, V_n]$ to generate and output an analog current vector $[I_1, I_2, \ldots, I_m]$, as illustrated in FIG. 4A. In particular, a given row current $I_i$ is computed as $$I_i = \sum_{j=1}^{n} V_j G_{ij}.$$

For example, the row current $I_1$ for the first row R1 is determined as $I_1=(V_1G_{11}+V_2\ G_{12}+, \ldots, +V_n\ G_{1n})$.

The resulting aggregate read currents $I_1, I_2, \ldots, I_m$ at the output of the respective rows R1, R2, . . . , Rm are input to respective row readout circuits 424-1, 424-2, . . . , 424-*m*. The aggregate read currents $I_1, I_2, \ldots, I_m$ are integrated by the respective current integrator circuits 426-1, 426-2, . . . , 426-*m* to generate respective output voltages, which are quantized by the respective ADC circuits 428-1, 428-2, . . . , 428-*m* to generate a resulting output vector $y=[y_1, y_2, \ldots, y_m]$, which represents the result of the matrix-vector multiplication operation y=Wx (or I=GV).

The forward pass operation shown in FIG. 4A for training an artificial neural network is performed to calculate neuron activations of a downstream layer (e.g., hidden layer or output layer) based on (i) neuron activations of an upstream layer (e.g., input layer or hidden layer) and (ii) the synaptic weights that connect the neurons of the upstream layer to the neurons of the downstream layer. For a single fully connected layer where, e.g., n input neurons are connected to m output (or hidden) neurons, the forward pass cycle (FIG. 4A) involves computing a matrix-vector multiplication y=Wx, where the input digital vector $x=[x_1, x_2, \ldots, x_n]$ represents the activities of the input neurons (e.g., upstream neuron excitation) and the matrix W of size m×n stores the weight values between each pair of input and output neurons. The resulting digital output vector $y=[y_1, y_2, \ldots, y_m]$ is further processed by performing a non-linear activation on each of the elements and then transmitted to the next downstream layer to continue the forward propagation operation.

As data propagates forward through layers of the neural network, vector-matrix multiplications are performed, wherein the hidden neurons/nodes take the inputs, perform a non-linear transformation, and then send the results to the next weight matrix. This process continues until the data reaches an output layer of the artificial neural network comprising output neurons/nodes. The output neurons/nodes evaluate classification errors, and generate classification error signals which are propagated back through the artificial neural network using backward pass operations. The error signals can be determined as a difference between the results of the forward inference classification (estimated labels) and the correct labels at the output layer of the artificial neural network.

For example, FIG. 4B schematically illustrates an exemplary configuration of the RPU system 400 to perform a backward pass operation of the backpropagation training process. The RPU system 400 in FIG. 4B is configured by controlling switching circuitry in the peripheral circuitry 420 and 430 to (i) selectively connect the row DAC circuits 422-1, 422-2, 422-*m* of the peripheral circuitry 420 to the respective rows R1, R2, . . . , Rm of the RPU array 405, and to (ii) selectively connect the column readout circuits 434-1, 434-2, . . . , 434-*n* of the peripheral circuitry 430 to the respective columns C1, C2, . . . , Cn of the RPU array 405. As schematically shown in FIG. 4B, the backward pass operation for training the artificial neural network is performed in a manner that is similar to the forward pass operation (FIG. 4A) except that an input vector $x_{err}=[x_1, x_2, \ldots, x_m]$ in FIG. 4B comprises a digital error vector $x_{err}$ which is backpropagated from a downstream layer of the artificial neural network model, and a matrix-vector multiplication is performed on the transpose of the weight matrix, i.e., $y_{err}=W^T\ x_{err}$ (or $I=G^TV$) to compute a digital output signal $y_{err}=[y_1, Y_2, \ldots, y_n]$ The digital input vector $x_{err}=[x_1, x_2, \ldots, x_m]$ represents the error calculated by the neurons of a downstream layer, and the digital output signal $y_{err}=[y_1, y_2, \ldots, y_n]$ represents the error signal that is generated and transmitted to the next upstream layer of the artificial neural network to continue the backward propagation operation. The backward propagation process continues until the error signals reach the input layer of the artificial neural network.

After the backward pass operation is completed on the given RPU array 405, a weight update process is performed to tune the conductance values of the RPU cells 410 (and thus update the weight values of the given synaptic weight matrix W) based on the forward-propagated digital vector $x=[x_1, x_2, \ldots, x_n]$ (FIG. 4A) and the backward-propagated digital error vector $x_{err}=[x_1, x_2, \ldots, x_m]$, which were previously input to the given RPU array 405 during the forward and backward pass operations. To perform the weight update operation, the RPU system 400 is configured by controlling switching circuitry in the peripheral circuitry 420 and 430 to (i) selectively connect the row DAC circuits 422-1, 422-2, 422-*m* of the peripheral circuitry 420 to the respective rows R1, R2, . . . , Rm of the RPU array 405, and to (ii) selectively connect the column DAC circuits 432-1, 432-2, 432-*n* of the peripheral circuitry 430 to the respective columns C1, C2, . . . , Cn of the RPU array 405.

In some embodiments, the weight update operation involves updating the weight matrix W in the given RPU array 405 by performing an outer product of the two vectors $x=[x_1, x_2, \ldots, x_n]$ and $x_{err}=[x_1, x_2, \ldots, x_n]$, that were applied to the RPU array 405 in the forward and the backward pass cycles. In particular, implementing the weight update for the given RPU array 405 involves performing a vector-vector outer product operation which consists of a multiplication operation and an incremental weight update to be performed locally in each RPU cell 410, i.e., $w_{ij} \leftarrow w_{ij}+\eta x_i \times x_{err\_j}$, where $w_{ij}$ represents the weight value for the $i^{th}$ row and the $j^{th}$ column (for simplicity layer index is omitted), where $x_i$ is the activity at the input neuron ($i^{th}$ row), $x_{err\_j}$ is the error computed by the output neuron (and input to the $j^{th}$ column), and where $\eta$ denotes a global learning rate. In some embodiments, to determine the product $x_i \times x_{err\_j}$ for the weight update operation, stochastic translator circuitry in the peripheral circuitry 420 and 430 can be utilized to generate stochastic bit streams that represent the input signals $x_i$ and $x_{err\_j}$. The stochastic bits streams for the input signals $x_i$ and $x_{err\_j}$ are applied to the rows and columns of the RPU cells 410 in the RPU array, wherein the conductance of a given RPU cell 410 will change depending on the coincidence of the $x_i$ and $x_{err\_j}$ stochastic pulse streams input to the given RPU cell 410. The vector cross product operations for the weight update operation are implemented based on the known concept that coincidence detection (using an AND logic gate operation) of stochastic streams representing real numbers is equivalent to a multiplication operation.

The exemplary embodiment of FIG. 4A schematically illustrates a process for performing a matrix-vector multiplication operation y=Wx for a forward pass operation wherein (i) the matrix W is stored in the RPU array 405 such that the $i^{th}$ row of RPU cells represents the $i^{th}$ row of the matrix W, and the $j^{th}$ column of RPU cells represents the $j^{th}$ column of the matrix W, (ii) the input vector x is input to the columns, and (iii) the resulting output vector y is generated at the output of the rows. In other embodiments, the same matrix-vector multiplication operation for the forward pass operation can be performed by (i) storing a transpose matrix $W^T$ of the matrix W in the RPU array 405 such that the $i^{th}$ row of the matrix W is stored in the RPU array 405 as the $j^{th}$ column of the transpose matrix $W^T$, (ii) applying the input vector x to the rows, and (iii) reading the resulting output vector y at the output of the columns. Further, the backward pass operation of FIG. 4B would be performed by back-propagating the errors by inputting the error vector $x_{err}$ to the columns of the RPU array 405, and obtaining the resulting output vector $y_{err}$ from the rows.

Figure 5A:
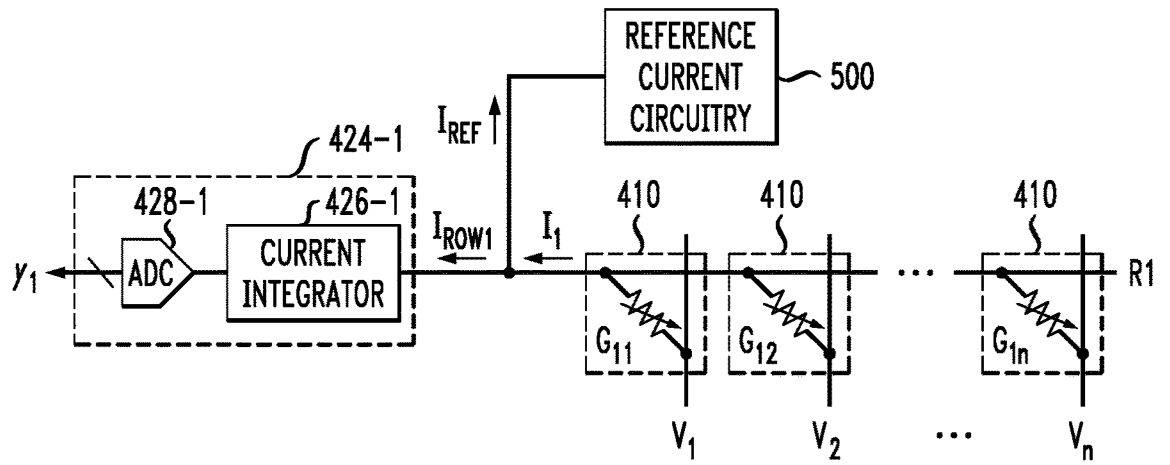
FIG. 5A schematically illustrates a method for configuring a resistive processing unit system to perform forward pass matrix-vector multiplication operation on a weight matrix stored in a resistive processing array using signed matrix values, according to an exemplary embodiment of the disclosure.
Figure 5B:
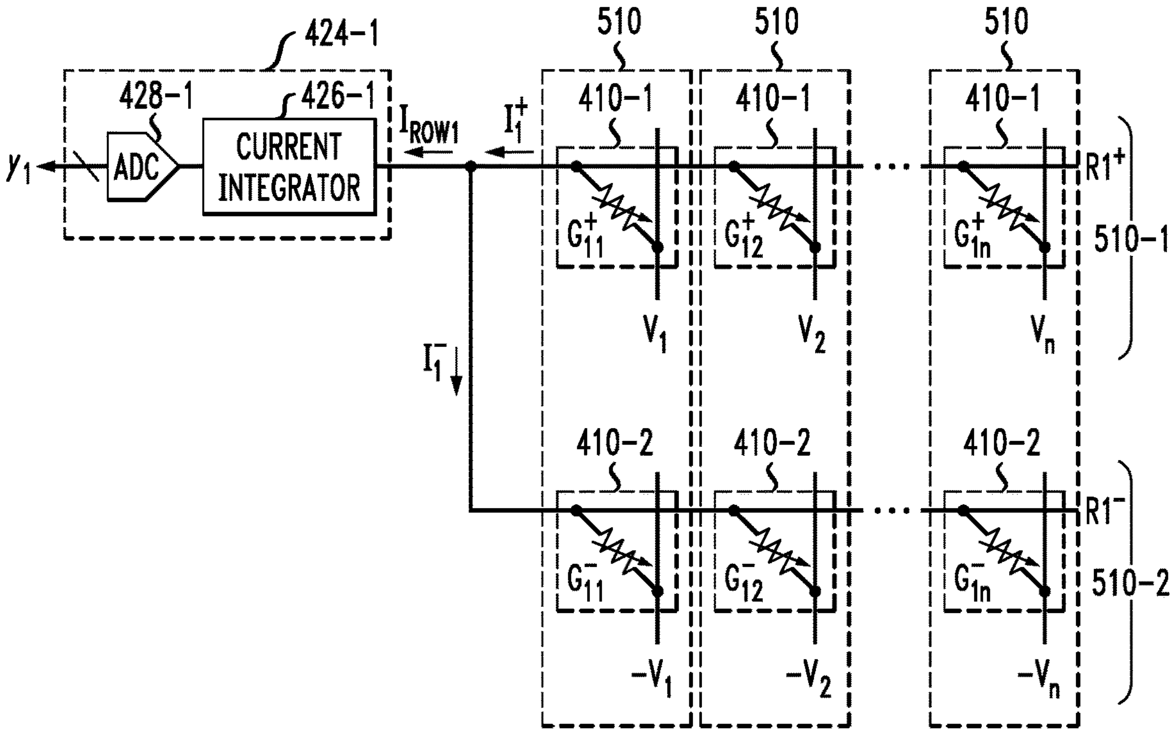
FIG. 5B schematically illustrates a method for configuring a resistive processing unit system to perform a forward pass matrix-vector multiplication operation on a weight matrix stored in a resistive processing unit array using signed matrix values, according to another exemplary embodiment of the disclosure.

While FIGS. 4A and 4B schematically illustrate an exemplary method performing matrix-vector multiplication operations using a single RPU array, other techniques can be implemented to perform a matrix-vector multiplication operation using "signed weights." For example, FIGS. 5A and 5B schematically illustrate methods for configuring an RPU system comprising an RPU array to perform an analog matrix-vector multiplication operation on a weight matrix stored in the RPU array using signed weight values, according to alternate exemplary embodiments of the disclosure. For illustrative purposes, the exemplary embodiments of FIGS. 5A and 5B will be discussed in the context of extending the RPU system 400 of FIG. 4A to enable the use of signed weights.

More specifically, FIG. 5A schematically illustrates a method for generating a row current during a matrix-vector multiplication operation using a reference current ($I_{REF}$) that is generated by a reference current circuitry 500 to enable "signed weights." For ease of illustration, FIG. 5A shows only the first row R1 and the associated readout circuit 424-1 the RPU system 400 of FIG. 4A. FIG. 5A schematically illustrates a differential read scheme in which a row current $I_{ROW1}$ that is input to the readout circuit 424-1 is determined as $I_{ROW1}=I_1-I_{REF}$. With this differential scheme, the row current $I_{ROW1}$ will have (i) a magnitude (which corresponds to an aggregate current or an individual weight value) and (ii) a sign (+, −, 0). The sign of the row current $I_{ROW1}$ will depend on the whether $I_1$ is greater than, equal to, or less than, the reference current $I_{REF}$. A positive sign ($I_{ROW1}>0$) will be obtained when $I_1>I_{REF}$. A zero value ($I_{ROW1}=0$) will be obtained when $I_1=I_{REF}$. A negative sign ($I_{ROW1}<0$) will be obtained when $I_1<I_{REF}$. While the reference current circuitry 500 is generically illustrated in FIG. 5A, the reference current circuitry 500 can be implemented using known techniques. For example, in some embodiments, the reference current circuitry 500 comprises a fixed current source which is configured to generate a reference current $I_{REF}$ with a known fixed magnitude that is selected for the given application.

Next, FIG. 5B schematically illustrates a method for generating a row current $I_{ROW1}$ using different row currents $I_1^+$ and $I_1^-$ from corresponding rows $R1^+$ and $R1^-$ of two separate RPU arrays 510-1 and 510-2, wherein the conductance is determined as $(G^+-G^-)$. More specifically, FIG. 5B schematically illustrates a differential read scheme in which the row current $I_{ROW1}$ that is input to the readout circuit 424-1 is determined as $I_{ROW1}=I_1^+-I_1^-$. As shown in FIG. 5B, each RPU cell 510 comprises two unit RPU cells 410-1 and 410-2 from two separate RPU arrays 510-1 and 510-2, respectively. With this differential scheme, the row current $I_{ROW1}$ will have a magnitude and sign, wherein the sign of the row current $I_{ROW1}$ will depend on the whether $I_1$ is greater than, equal to, or less than, $I_1^-$. A positive sign ($I_{ROW1}>0$) will be obtained when $I_1>I_1^-$. A zero value ($I_{ROW1}=0$) will be obtained when $I_1=I_1^-$. A negative sign ($I_{ROW1}<0$) will be obtained when $I_1<I_1^-$.

More specifically, in the exemplary embodiment of FIG. 5B, as noted above, each RPU cell 510 comprises two unit RPU cells 410-1 and 410-2 which have respective conductance values dented as $G_{ij}^+$ and $G_{ij}^-$, wherein the conductance value of a given RPU cell 510 is determined as the difference between the respective conductance values, i.e., $G_{ij}=G_{ij}^+-G_{ij}^-$ where i and j are row and column indices within the RPU arrays 510-1 and 510-2. In this way, negative and positive weights can be readily encoded using positive-only conductance values. In other words, since the conductance values of the resistive devices of the RPU cells can only be positive, the differential scheme in FIG. 5B implements a pair of identical RPU arrays to encode positive ($G_{ij}^+$) and negative ($G_{ij}^-$) matrix values, wherein the matrix value ($G_{ij}$) of a given RPU cell is proportional to a difference of two conductance values stored in two corresponding devices ($G_{ij}^+-G_{ij}^-$) located in identical positions of the pair of RPU arrays 510-1 and 510-2. In some embodiments, the two RPU arrays 510-1 and 510-2 can be stacked on top of each other in a back-end-of-line metallization structure of a chip. In this instance, a single RPU tile is deemed a pair of RPU arrays with the peripheral circuitry that support the operations of the singe RPU tile.

A shown in FIG. 5B, positive voltage pulses ($V_1$, $V_2$, . . . , $V_n$) and corresponding negative voltage pulses ($-V_1$, $-V_2$, . . . , $-V_n$) are supplied separately to the RPU cells 410-1 and 410-2 in corresponding rows in the identical RPU arrays 510-1 and 510-2 that are used to encode positive and negative matrix values. The row currents $I_1^+$ and $I_1^-$ that are output from the corresponding first rows $R1^+$ and $R1^-$ in the respective RPU arrays 510-1 and 510-2 are combined to generate a differential current $I_{ROW1}$ which is input to the readout circuit 424-1 connected to the corresponding first rows $R1^+$ and $R1^-$.

In some embodiments where complex matrices are implemented (e.g., a complex matrix which comprises a real part and an imaginary part), the RPU framework of FIG. 5B can be implemented to store real and imaginary matrix values in two distinct RPU arrays. For example, in the exemplary embodiment of FIG. 5B, the first RPU array 510-1 can be configured to store the real matrix values of a complex matrix, while the corresponding second RPU array 510-2 is configured to store the imaginary matrix values of the complex matrix. In this manner, the respective parts can then be processed separately, making it possible to obtain a conjugate transpose A* and a pseudoinverse A†. In other embodiments, each RPU cell 510 in FIG. 5B can be implemented using two adjacent unit RPU cells 410-1 and 410-2 on the same RPU array. For example, in FIG. 5B, the rows implemented $R1^+$ and $R1^-$ can be two adjacent rows of the same RPU array (e.g., same RPU tile). In such configuration, the control lines of the RPU array would be configured to support such RPU cell configuration, as is understood by those of ordinary skill in the art.

As noted above, exemplary embodiments of the disclosure comprise automated calibration techniques which are configured to determine correction parameters that are applied to analog matrix-vector multiplication operations for forward pass and backward pass operations. The correction parameters serve to compensate for differences in actual effective weight values that are realized in the forward and backward pass operations as a result of offsets and mismatches introduced by the RPU hardware when performing the analog matrix-vector operations. Such automated calibration methods take into consideration that while the conductance values of the RPU cells of a given RPU array can be programmed to encode weight values of a weight matrix W that is stored in the RPU array, the actual effective weight values of the stored weight matrix W (which are effectively read when performing forward pass or backward pass operations) can differ from the encoded weight values as a result of various types of offsets and mismatches, etc., of the RPU hardware (e.g., peripheral circuitry).

For example, when performing a matrix-vector multiplication operation using the RPU system 400 configured to perform a forward pass operation (as shown in FIG. 4A), applying an input vector x to the RPU system 400 results in an output vector y, where ideally, y=Wx, where W denotes the matrix of encoded weights stored in the RPU array 405. However, due to noise, mismatches, offsets, etc., in the RPU hardware, the value of the resulting output vector y will actually be y=Wx+b+f(x)+noise, where b, f(x), and noise denote various error components that may arise due to the analog RPU hardware. Similarly, when performing the backward pass operation (as shown in FIG. 4B), applying an input vector $x_{err}$ to the RPU system 400 results in an output vector $y_{err}$, where ideally, $y_{err}=W^T x_{err}$, where $W^T$ denotes the transpose of the matrix W of the encoded weights stored in the RPU array 405. However, due to noise, mismatches, offsets, etc., in the RPU hardware, the value of the resulting output vector $y_{err}$ will actually be $y_{err}=W^T x_{err}+b+f(x)+$ noise.

More specifically, the error component b collectively represents linear errors (e.g., offsets) associated with the RPU hardware. For example, referring to the RPU hardware shown in FIGS. 4A, 4B, 5A, and 5B, such linear errors can result from, e.g., (i) voltage drops due to series resistance of row and column lines in the RPU array 405 and leakage current, (ii) mismatches between the row DAC circuits 422 resulting in mismatches in the analog voltages that are generated from the digital input vector values and input to the rows of the RPU array 405, (iii) mismatches between the column DAC circuits 432 resulting in mismatches in the analog voltages that are generated from the digital input vector values and input to the columns of the RPU array 405, (iv) mismatches between the row readout circuits 424 and mismatches between the column readout circuits 434 (e.g., mismatches between the integration capacitors, variance of input voltage offsets of the operational amplifiers, mismatches between the ADC circuits, ADC offset errors of the ADC circuits, etc.), (v) mismatches between current mirrors that implement the reference current circuitry 500 (FIG. 5A), and other types of hardware mismatches and offset errors.

Further, the error component f(x) collectively represents non-linear behaviors of the RPU hardware resulting from, e.g., degraded performance of the operational amplifiers or power supplies, non-linearities of the current mirrors, ADCs, integration capacitors, resistances, etc. The error component noise denotes cycle-to-cycle noise of the RPU hardware such as thermal noise or hardware drift, etc.

When performing a matrix-vector multiplication operation y=Wx for the forward pass operation of FIG. 4A, the error components b, f(x), and noise result in a misrepresentation of the encoded (programmed) weight values of the weight matrix W because such error components b, f(x), and noise cause errors/variations in, e.g., (i) the analog input voltages that are applied to the columns of the RPU array 405, (ii) the analog currents that are output from the rows of the RPU array 405, and (iii) the resulting digital output vector $y=[y_1, y_2, \ldots, y_m]$ generated by row readout circuits 424. The same applies when performing a matrix-vector multiplication operation $y_{err}=W^T x_{err}$ for the backward pass operation of FIG. 4B.

In this regard, techniques that read weight values of an RPU row-by-row, or which otherwise attempt to read the actual conductance values of the RPU cells, result in the extraction of inaccurate weight values due to such error components, wherein the extracted weight values do not match the true encoded/programmed weights. In other words, the effective weight values of the weight matrix W stored in the RPU array are encoded based on the entire RPU hardware, e.g., the programmed/encoded conductance values of the RPU cells, and the various offsets and mismatches of the RPU hardware. The various offsets and mismatches of the RPU hardware (linear error components b) do not affect the actual analog matrix-vector multiplication operation y=Wx, but rather only affect the effective weight values W that are encoded by the RPU hardware as a whole.

While various techniques can be used to calibrate the RPU hardware to compensate for such linear error components b, it is extremely difficult to calibrate the RPU hardware so that the effective weight values of the weight matrix W realized in the forward pass and backward pass operations are the same. By way of example, in the exemplary embodiments of FIGS. 4A and 4B, assume that the conductance value $G_{11}$ of the RPU cell 410 at the intersection of the first row R1 and the first column C1 of the RPU array 405 is programmed to encode a weight $W_{11}$. In the forward pass operation (FIG. 4A), the effective weight value of the weight $W_{11}$ is a function of, e.g., the programmed weight value $W_{11}$ and the strength of the column DAC circuit 432-1 and the row readout circuit 424-1. On the other hand, in the backward pass operation (FIG. 4B), the effective weight value of the weight $W_{11}$ is a function of, e.g., the programmed weight value $W_{11}$ and the strength of the row DAC circuit 422-1 and the column readout circuit 434-1. Due to mismatches and offsets of the RPU hardware, the effective value of the weight $W_{11}$ as realized in the forward direction may differ from the effective value of the of the weight $W_{11}$ as realized in the backward direction.

Figure 6A:
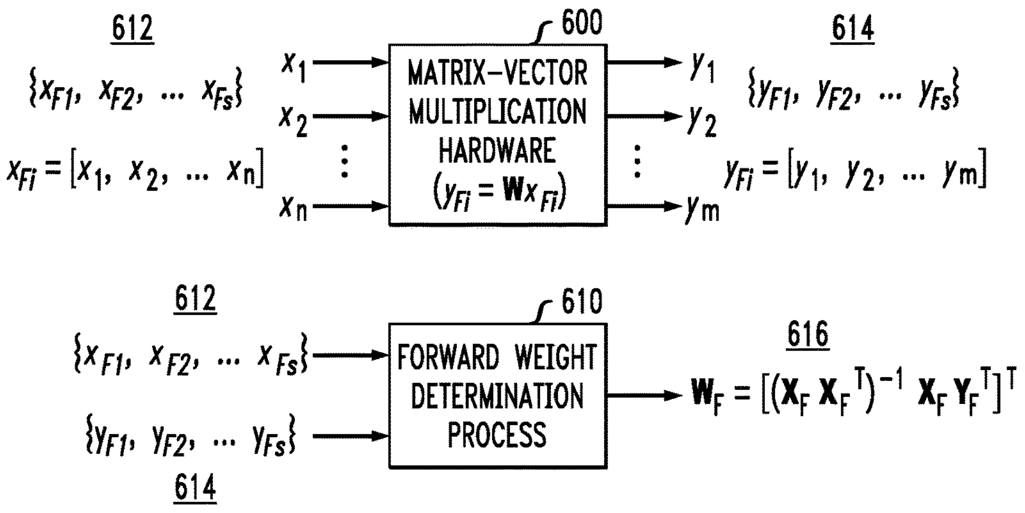
FIGS. 6A, 6B, and 6C schematically illustrate methods that are performed as part of an automated calibration process that is configured to determine calibration parameters used to calibrate forward pass and backward pass matrix-vector operations performed on a resistive processing unit system, according to an exemplary embodiment of the disclosure.
Figure 6B:
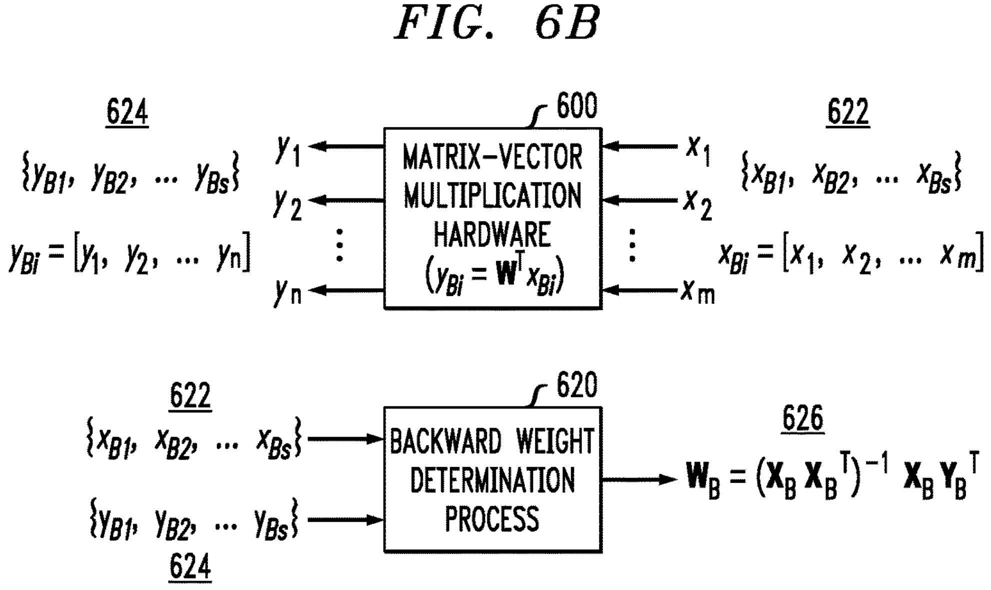
Figure 6C:
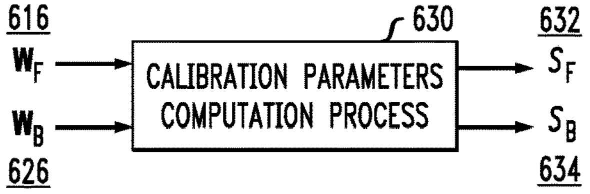

In this regard, to calibrate the forward weights against the backward weights, an automated calibration process is performed to determine correction parameters that are used to calibrate forward weights $W_F$ against backward weights $W_B$, which are realized for a given weight matrix W stored in a given RPU array, to thereby ensure that the forward weights $W_F$ and the backward weights $W_B$ encode the same weight matrix when performing forward and backward pass matrix-vector multiplication operations on the given RPU array. FIGS. 6A, 6B, and 6C schematically illustrate methods that are performed as part of an automated calibration process that is configured to determine calibration parameters used to calibrate forward pass and backward pass matrix-vector operations performed on a resistive processing unit system, according to an exemplary embodiment of the disclosure. In some embodiments, FIGS. 6A, 6B, and 6C schematically illustrate modes of operation of the autocalibration process 130 of FIG. 1.

For example, in some embodiments, FIGS. 6A and 6B schematically illustrate methods that are performed by the weight extraction process 132 to extract weight values from RPU hardware with high precision despite the fact that the RPU hardware can be noisy and have limited precision. In particular, FIG. 6A schematically illustrates a method for extracting an effective forward weight matrix $W_F$ which is encoded by the RPU hardware when performing a forward pass operation on a given weight matrix W stored in a given RPU array, and FIG. 6B schematically illustrates a method for extracting a backward weight matrix $W_B$ which is encoded by the RPU hardware when performing a backward pass operation on a transpose of the given weight matrix W stored in the given RPU array.

In accordance with exemplary embodiments, the weight extraction process 132 is configured to accurately extract weight values from RPU hardware despite non-idealities of the RPU hardware. In general, the weight extraction process 132 implements optimization techniques to minimize errors in the weight values of a weight matrix W, which are read from a given RPU array (which stores the weight matrix W) by utilizing a linear transformation between (i) a set of input vectors x that are applied to the given RPU array, and (ii) a corresponding set of output vectors y that are generated by the RPU hardware performing matrix-vector multiplication operations. More specifically, techniques are provided to extract effective forward weight values $W_F$ and effective backward weight values $W_B$ from the RPU hardware in which the computation of the effective forward and backward weight values $W_F$ and $W_B$ is configured to compensate/correct the non-idealities associated with the RPU hardware.

For example, in some embodiments, the effective forward and backward weight values $W_F$ and $W_B$ comprise values that minimize an objective function such as a multivariate linear regression function. In this regard, in some embodiments, the effective forward and backward weight values $W_F$ and $W_B$ of a given weight matrix W stored in an RPU array are determined by performing a multivariate linear regression computation based on (i) a set of input vectors x that are applied to a given RPU array in forward and backward directions, and (ii) a corresponding set of output vectors y that are generated by the RPU hardware performing matrix-vector multiplication operations in the forward and backward directions.

In some embodiments, the multivariate linear regression computation is configured to relate the set of input vectors x and corresponding set of resulting output vectors y to the given weight matrix W stored in an RPU array such that y=W x+b. In this regard, a multivariate linear regression computation allows for an accurate estimation of the effective forward and backward weight values $W_F$ and $W_B$ of the given weight matrix W stored in an RPU array, wherein the computation of the effective forward and backward weight values $W_F$ and $W_B$ compensates/corrects the error component b (e.g., linear offset errors) of the RPU hardware and, thus, provides a true measure of the matrix-vector multiplication performance of the RPU hardware in the forward and backward directions.

FIG. 6A schematically illustrates a method for extracting forward weight values $W_F$ of a weight matrix stored in an RPU array, according to an exemplary embodiment of the disclosure. In particular, FIG. 6A schematically illustrates a matrix-vector multiplication hardware block 600, and a forward weight determination process 610. The matrix-vector multiplication hardware block 600 is assumed to be "black box" hardware (e.g., hardware matrix-vector multiplication engine) which is configured to perform matrix-vector multiplication operations in both forward and backward directions. The exemplary weight extraction methods as discussed herein (e.g., forward weight determination process 610) take into consideration a macroscopic functional operation of the "black box" matrix-vector multiplication hardware rather than a microscopic functional architecture/description of such hardware. In this regard, it is to be appreciated that the exemplary weight extraction techniques as disclosed herein are agnostic to the underlying hardware implementation of the matrix-vector multiplication hardware block 600.

As shown in FIG. 6A, the matrix-vector multiplication hardware block 600 sequentially receives as input a plurality (s) of input vectors 612, denoted $\{x_{F1}, x_{F2}, \ldots, x_{Fs}\}$ or $$\{x_{Fi}\}_{i=1}^{s},$$

wherein each input vector $x_{Fi}$ comprises a vector (e.g., n×1 column vector) of n parameters, $x_{Fi}=[x_1, x_2, \ldots, x_n]$. The matrix-vector multiplication hardware block 600 is configured to store a weight matrix W (e.g., m×n matrix) and perform a matrix-vector multiplication operation in a forward direction on each input vector $x_{Fi}$ to thereby compute a corresponding resulting output vector $y_{Fi}$, wherein $y_{Fi}=Wx_{Fi}$. In response to the plurality (s) of input vectors 612 $\{x_{F1}, x_{F2}, x_{Fs}\}$, the matrix-vector multiplication hardware block 600 outputs a plurality (s) of corresponding output vectors 614 $\{y_{F1}, y_{F2}, \ldots y_{Fs}\}$, wherein each resulting output vector $Y_{Fi}$ (e.g., m×1 column vector) comprises a vector of m parameters, $y_{Fi}=[y_1, y_2, \ldots y_m]$.

The matrix-vector multiplication operations in the forward direction, i.e., $y_{Fi}=Wx_{Fi}$, result in a set of vector pairs, $$\{x_{Fi}, y_{Fi}\}_{i=1}^{S},$$

comprising s pairs of vectors $x_{Fi}$ and $Y_{Fi}$ (or s observations), which are utilized by the forward weight determination process 610 to compute a matrix of effective forward weight values $W_F$ 616 for the m×n weight matrix W stored in the matrix-vector multiplication hardware block 600. In some embodiments, the forward weight determination process 610 generates (i) a first matrix $X_F$ of size n×s in which each column of the first matrix $X_F$ comprises a corresponding one of the input vectors $$\{x_{Fi}\}_{i=1}^{s}$$

and (ii) a second matrix $Y_F$ of size m×s in which each column of the second matrix $Y_F$ comprises a corresponding one of the resulting output vectors $$\{y_{Fi}\}_{i=1}^{s}.$$

In some embodiments, the forward weight determination process 610 computes the effective forward weight values $W_F$ of a given weight matrix W stored in the matrix-vector multiplication hardware block 600 by performing a multivariate linear regression computation based on the first matrix $X_F$ and the second matrix $Y_F$. In some embodiments, a multivariate linear regression computation is performed using an ordinary least squares (OLS) estimator process which is configured to estimate parameters in a regression model by minimizing the sum of the squared residuals, $$\min_{W}\|Y_F - WX_F\|^2.$$

For example, in some embodiments, when the matrix-vector multiplication hardware block 600 is configured to compute $y_{Fi}=Wx_{Fi}$ (forward direction), the forward weight determination process 610 computes the matrix of effective forward weight values $W_F$ as:

$$W_F = \left[\left(X_F X_F^T\right)^{-1} X_F Y_F^T\right]^T \qquad \text{Eqn. 1}$$

wherein $W_F$ denotes an OLS estimator, the matrix $X_F$ comprises a matrix of regressor variables, the matrix $Y_F$ comprises a matrix of values of a response variable, and wherein $$Y_F^T$$

denotes a transpose of the matrix $Y_F$. In the above exemplary embodiment, where the weight matrix W is a m×n matrix and the matrix $X_F$ is a n×s matrix, the computation of the matrix $$X_F X_F^T$$

in Eqn. 1 yields an n×n matrix. In this regard, to properly compute the inverse matrix $$\left(X_F X_F^T\right)^{-1},$$

the rank of the matrix $$X_F X_F^T$$

in Eqn. 1 should be equal to n, wherein the rank of a matrix is defined as the maximum number of linearly independent row vectors in the matrix.

Another factor that should be considered in Eqn. 1 for accurately computing $W_F$ is the sensitivity of $W_F$ based on the condition number of the matrix $$X_F X_F^T$$

for inversion. A condition number for a matrix and computational task measures how sensitive the resulting solution is to perturbations in the input data and to roundoff errors made during the solution process. In some embodiments, it is preferable that the condition number of the matrix $$X_F X_F^T$$

be equal to 1, or as close as possible to 1. Ideally, the matrix $$X_F X_F^T$$

will be an identity matrix I. In this regard, the matrix $$X_F X_F^T$$

should be well-conditioned in order to more accurately compute the inverse matrix $$\left(X_F X_F^T\right)^{-1}.$$

In some embodiments, the set of input vectors $x_{Fi}$ which make up the matrix $X_F$ can be selected to achieve a well-conditioned matrix $$X_F X_F^T$$

for inversion.

Next, FIG. 6B schematically illustrates a method for extracting backward weight values $W_B$ of a weight matrix stored in an RPU array, according to an exemplary embodiment of the disclosure. In particular, FIG. 6B schematically illustrates the matrix-vector multiplication hardware block 600, and a backward weight determination process 620. The matrix-vector multiplication hardware block 600 in FIG. 6B is the same as the matrix-vector hardware multiplication block 600 of FIG. 6A, but wherein the matrix-vector multiplication hardware block 600 in FIG. 6B is configured to perform matrix-vector multiplication operations in a backward direction, i.e., $y_{Bi}=W^T x_{Bi}$.

As shown in FIG. 6B, the matrix-vector multiplication hardware block 600 sequentially receives as input a plurality (s) of input vectors 622, denoted $\{x_{B1}, x_{B2}, \ldots x_{Bs}\}$ or $$\{x_{Bi}\}_{i=1}^{s},$$

wherein each input vector $x_{Bi}$ comprises a vector (e.g., m×1 column vector) of m parameters, $x_{Bi}=[x_1, x_2, \ldots, x_m]$. The matrix-vector multiplication hardware block 600, which stores the weight matrix W (e.g., m×n matrix) is configured to perform matrix-vector multiplications in a backward direction on each $x_{Bi}$ to thereby compute a corresponding resulting output vector $y_{Bi}$, wherein $y_{Bi}=W^T x_{Bi}$. In response to the plurality (s) of input vectors 622 $\{x_{B1}, x_{B2}, \ldots x_{Bs}\}$, the matrix-vector multiplication hardware block 600 outputs a plurality (s) of corresponding output vectors 624 $\{y_{B1}, y_{B2}, \ldots y_{Bs}\}$, wherein each resulting output vector $y_{Bi}$ (e.g., n×1 column vector) comprises a vector of n parameters, $y_{Bi}=[y_1, y_2, \ldots, y_n]$.

The matrix-vector multiplication operations in the backward direction, i.e., $y_{Bi}=W^T x_{Bi}$, result in a set of vector pairs, $$\{x_{Bi}, y_{Bi}\}_{i=1}^{S},$$

comprising s pairs of vectors $x_{Bi}$ and $y_{Bi}$ (or s observations), which are utilized by the backward weight determination process 620 to compute a matrix of effective backward weight values $W_B$ 626 for the m×n weight matrix W stored in the matrix-vector multiplication hardware block 600. In some embodiments, the backward weight determination process 620 generates (i) a first matrix $X_B$ of size m×s in which each column of the first matrix $X_B$ comprises a corresponding one of the input vectors $$\{x_{Bi}\}_{i=1}^{s}$$

and (ii) a second matrix $Y_B$ of size n×s in which each column of the second matrix $Y_B$ comprises a corresponding one of the resulting output vectors $$\{y_{Bi}\}_{i=1}^{s}.$$

In some embodiments, the backward weight determination process 620 computes the effective backward weight values $W_B$ of the given weight matrix W stored in the matrix-vector multiplication hardware block 600 by performing a multivariate linear regression computation based on the first matrix $X_B$ and the second matrix $Y_B$. In some embodiments, a multivariate linear regression computation is performed using an ordinary least squares (OLS) estimator process which is configured to estimate parameters in a regression model by minimizing the sum of the squared residuals, $$\min_W \|Y_B - W^T X_B\|^2.$$

For example, in some embodiments, when the matrix-vector multiplication hardware block 600 is configured to compute $y_{Bi}=W^T x_{Bi}$ (backward pass direction), the backward weight determination process 620 computes the matrix of effective backward weight values $W_B$ as:

$$W_B = \left[(X_B X_B^T)^{-1} X_B Y_B^T\right], \quad \text{Eqn. 2}$$

wherein $W_B$ denotes an OLS estimator, the matrix $X_B$ comprises a matrix of regressor variables, the matrix $Y_B$ comprises a matrix of values of a response variable, and wherein $$Y_B^T$$

denotes a transpose of the matrix $Y_B$. In the above exemplary embodiment, where the transposed weight matrix $W^T$ is a n×m matrix and the matrix $X_B$ is a m×s matrix, the computation of the matrix $$X_B X_B^T$$

in Eqn. 2 yields an m×m matrix. In this regard, to properly compute the inverse matrix $$(X_B X_B^T)^{-1},$$

the rank of the matrix $$X_B X_B^T$$

in Eqn. 2 should be equal to m, where (as noted above) the rank of a matrix is defined as the maximum number of linearly independent row vectors in the matrix. In addition, in some embodiments, as discussed above, the set of input vectors $x_{Bi}$ which make up the matrix $X_B$ is preferably selected to achieve a well-conditioned matrix $$X_B X_B^T$$

for inversion.

As discussed above, the forward weight determination process 610 and the backward weight determination process 620 are configured to determine the effective forward weight values $W_F$ and the effective backward weight values $W_B$ of the given weight matrix W stored in the matrix-vector multiplication hardware block 600. As explained in further detail below in conjunction with FIG. 6C, the effective forward weight values $W_F$ and the effective backward weight values $W_B$ are utilized to compute scaling correction parameters that are to be applied for forward and backward pass operations. Furthermore, in some embodiments, the forward weight determination process 610 and the backward weight determination process 620 are configured to determine offset correction parameters $O_F$ and $O_B$ that are to be applied during forward and backward pass operations to correct for offset errors.

More specifically, as noted above, the forward weight determination process 610 is configured to determine the effective forward weight values $W_F$ for forward pass matrix-vector multiplication operations by taking into consideration that the linear errors in the RPU hardware actually result in the computation of $y=W x+b_F$, where $b_F$ denotes a bias term for the forward operation which is caused by various offset errors in the RPU hardware. Similarly, the backward weight determination process 620 is configured to determine the effective backward weight values $W_B$ for backward pass matrix-vector multiplication operations by taking into consideration that the linear errors in the RPU hardware actually result in the computation of $y=W^T x+b_B$, where $b_B$ denotes a bias term for the backward pass operation which is caused by various offset errors in the RPU hardware. The forward weight determination process 610 and the backward weight determination process 620 can be configured to determine the respective bias terms $b_F$ and $b_B$, wherein such bias terms are then utilized to determine a set of offset correction parameters $O_F$ and $O_B$ that are to be applied during forward and backward pass operations.

For example, assume that the forward weight determination process 610 is performed on the RPU system 400 as shown in FIG. 4A, which is configured to perform forward pass operations by applying the set of input vectors $x_{Fi}$ to the columns of the RPU array and obtaining the output vectors $y_{Fi}$ on the rows of the RPU array 405. To determine the bias terms $b_F$ for the forward pass operations, an additional dummy column (e.g., $C_{n+1}$) of weights ($W_{1(n+1)}$, $W_{2(n+1)}$, . . . , $W_{m(n+1)}$) having encoded weight values of "0" can be included in the computations, wherein each input vector $x_{Fi}$ would include an additional element $x_{n+1}$, i.e., $x_{Fi}=[x_1, x_2, \ldots, x_n, x_{n+1}]$. For each input vector $x_{Fi}$, the value of $x_{n+1}$ would be equal to "1" for all computations. With this process, the effective forward weight values of the weights $W_{1(n+1)}$, $W_{2(n+1)}$, . . . , $W_{m(n+1)}$ in the dummy column $C_{n+1}$ would represent the respective bias terms $b_{F1}$, $b_{F2}$, . . . , $b_{Fm}$ (offsets value) of the respective rows R1, R2, . . . , Rm. The offset correction parameters $O_{F1}$, $O_{F2}$, . . . , $O_{Fm}$ for the forward pass operation would be determined such that the offsets for the forward pass operations would be "0" (e.g., $O_{F1}+b_{F1}=0$).

In addition, assume that the backward weight determination process 620 is performed on the RPU system 400 as shown in FIG. 4B, which is configured to perform backward pass operations by applying the set of input vectors $x_{Bi}$ to the rows of the RPU array 405 and obtaining the output vectors $y_{Bi}$ on the columns of the RPU array 405. To determine the bias terms $b_B$ for the backward pass operations, an additional dummy row (e.g., $R_{m+1}$) of weights ($W_{(m+1)1}$, $W_{(m+1)2}$, . . . , $W_{(m+1)n}$) having encoded weight values of "0" can be included in the computations, wherein each input vector $x_{Bi}$ applied to the rows would include an additional element $x_{m+1}$, i.e., $x_{Bi}=[x_1, x_2, \ldots, x_m, x_{m+1}]$. For each input vector $x_{Bi}$, the value of $x_{m+1}$ would be equal to "1" for all computations. With this process, the effective backward weight values of $W_{(m+1)1}$, $W_{(m+1)2}$, . . . , $W_{(m+1)n}$ in the dummy row $R_{m+1}$ would represent the respective bias terms $b_{B1}$, $b_{B2}$, . . . , $b_{Bn}$ (offset values) of the respective columns C1, C2, . . . , Cn. The offset correction parameters $O_{B1}$, $O_{B2}$, . . . , $O_{Bn}$ for the backward pass operation would be determined such that the offsets for the backward pass operations would be "0" (e.g., $O_{B1}+b_{B1}=0$).

Next, FIG. 6C schematically illustrates a calibration parameters computation process which is configured to determine scaling correction factors for forward pass and backward pass matrix-vector multiplication operations on an RPU array, according to an exemplary embodiment of the disclosure. In some embodiments, FIG. 6C schematically illustrates an exemplary mode of operation of the calibration parameters computation process 134 of the autocalibration process 130 of FIG. 1. As shown in FIG. 6C, the calibration parameters computation process 630 utilizes the effective forward and backward weight matrices $W_F$ and $W_B$, which are generated by the respective forward and backward weight determination processes 610 and 620, to automatically determine a set of forward pass scaling correction parameters SF 632 and a set of backward pass scaling correction parameters $S_B$ 634.

In some embodiments, the calibration parameters computation process 630 implements a multivariate linear regression optimization to compute:

$$S_F W_F - W_B S_B = 0, \qquad \text{Eqn. 3}$$

where $S_F$ denotes a forward scaling matrix, and $S_B$ denotes a backward scaling matrix, wherein $S_F$ and $S_B$ each comprise a diagonal matrix (more generally, a scaling matrix). A diagonal matrix is a matrix in which the matrix values outside the main diagonal are all zero, and the matrix values of the main diagonal can either be zero or nonzero. The forward scaling matrix $S_F$ comprises a set of scaling correction parameters which are applied to the forward pass matrix-vector computations, and the backward scaling matrix $S_B$ comprises a set of scaling correction parameters which are applied to backward pass matrix-vector computations.

By way of example, for the RPU array 405 shown in FIG. 4A which is configured to perform a forward pass matrix-vector multiplication operation, y=Wx, where W is an m×n weight matrix, the forward scaling matrix $S_F$ is a m×m scaling matrix in which the matrix values $S_{11}$, $S_{22}$, . . . , $S_{mm}$ along the diagonal of the forward scaling matrix SF comprise the forward scaling correction parameters that are applied to, e.g., the respective elements of the output vector $y=[y_1, y_2, \ldots, y_m]$ which are generated by the row readout circuits 424-1, 424-2, . . . , 424-$m$ for the respective rows R1, R2, . . . , Rm. Moreover, for the RPU array 405 shown in FIG. 4B which is configured to perform a backward pass matrix-vector multiplication operation, $y=W^T x$, where $W^T$ is an n×m weight matrix, the backward scaling matrix $S_B$ is a n×n scaling matrix in which the matrix values $S_{11}$, $S_{22}$, . . . , $S_{nn}$ along the diagonal of the backward scaling matrix $S_B$ comprise the backward scaling correction parameters that are applied to, e.g., the respective elements of the output vector $y_{err}=[y_1, y_2, \ldots, y_n]$ which are generated by the column readout circuits 434-1, 434-2, . . . , 434-$n$ for the respective columns C1, C2, . . . , Cn.

In view of the above, for the exemplary RPU configurations shown in FIGS. 4A and 4B with a m×n weight matrix W, the exemplary autocalibration process of FIGS. 6A, 6B, and 6C would result in the generation of (i) a set of m offset correction parameters, $O_F=\{O_{F1}, O_{F2}, \ldots, O_{Fm}\}$ for forward pass matrix-vector multiplication operations, (ii) a set of m scaling correction parameters, $S_F=\{S_{F1}, S_{F2}, \ldots, S_{Fm}\}$ for forward pass matrix-vector multiplication operations, (iii) a set of n offset correction parameters, $O_B=\{O_{B1}, O_{B2}, \ldots, O_{Bn}\}$ for backward pass matrix-vector multiplication operations, and (iv) a set of n scaling correction parameters, $S_B=\{S_{B1}, S_{B2}, \ldots, S_{Bn}\}$ for backward pass matrix-vector multiplication operations. In this regard, assuming m=n=100, the weight matrix W (as well as the transpose matrix $W^T$) would comprise 10K weight values, while the total amount of calibration parameters would be 400. In particular, the 400 calibration parameters would include (i) 200 calibration parameters to calibrate a forward pass matrix-vector multiplication operation (e.g., 100 scaling correction parameters $S_F$, and 100 offset correction parameters $O_F$), and (ii) 200 calibration parameters to calibrate a backward pass matrix-vector multiplication operations (e.g., 100 scaling correction parameters $S_B$, and 100 offset correction parameters $O_B$).

Figure 7:
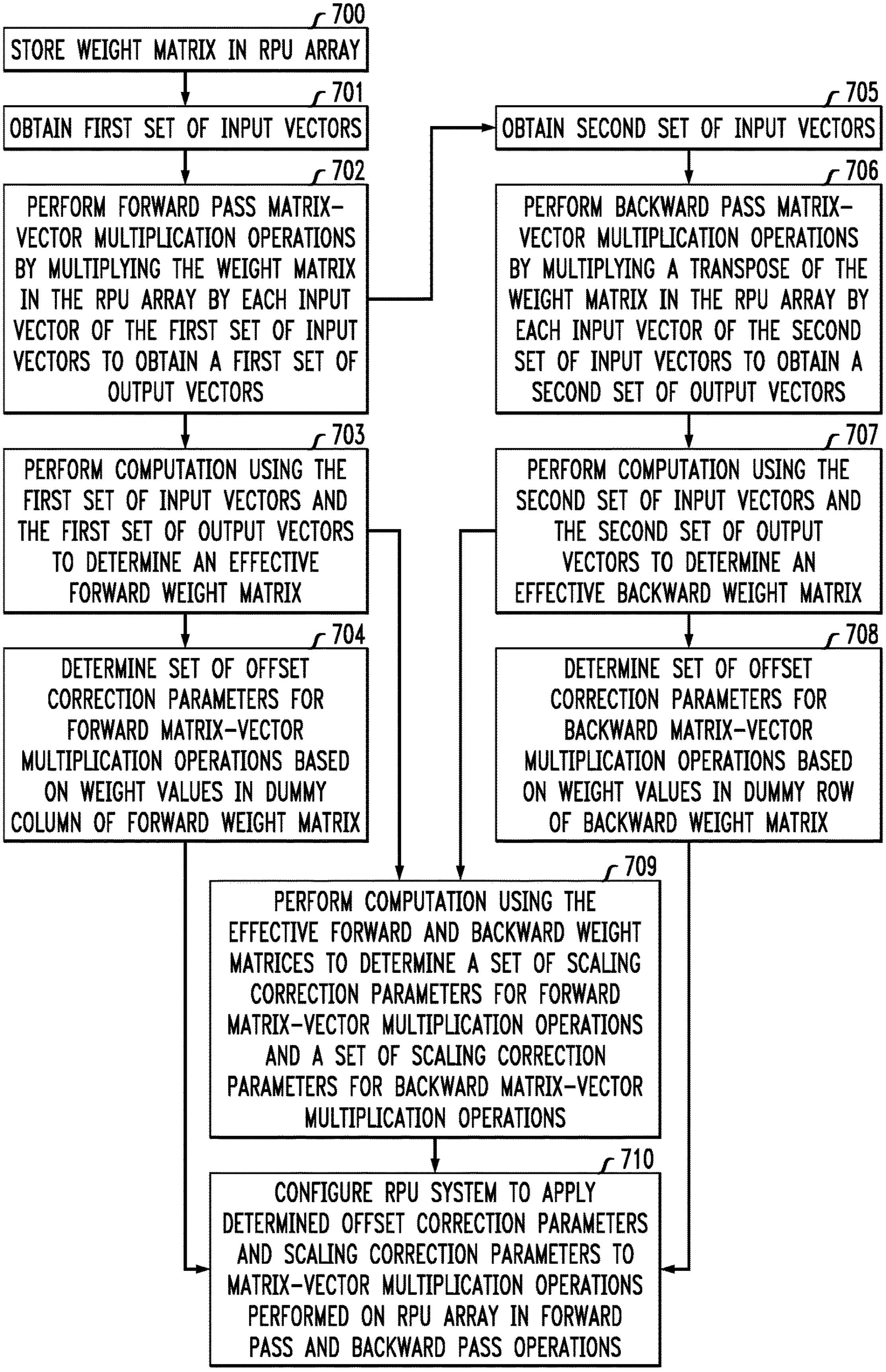
FIG. 7 illustrates a flow diagram of a method for determining calibration parameters that are utilized for calibrating forward pass and backward pass matrix-vector multiplication operations on resistive processing unit hardware, according to an exemplary embodiment of the disclosure.

FIG. 7 illustrates a flow diagram of a method for determining calibration parameters that are utilized for calibrating forward pass and backward pass matrix-vector multiplication operations on RPU hardware, according to an exemplary embodiment of the disclosure. In some embodiments, FIG. 7 illustrates exemplary modes of operation of the autocalibration process 130 of FIG. 1 and the processes schematically illustrated in FIGS. 6A, 6B, and 6C. The process begins by storing a weight matrix W in a given RPU array (e.g., RPU tile) of an RPU system (block 700). For ease of explanation, the process of FIG. 7 will be discussed in the context of calibrating forward pass and backward pass matrix-vector multiplication operations for a given RPU array (e.g., RPU tile) of RPU hardware, but it is to be understood that the same process of FIG. 7 would be applied to each RPU array that is to be used for implementing and hardware training an artificial neural network. In some embodiments, the process steps 700-708 in FIG. 7 correspond to processes that are performed by the weight extraction process 132 of FIG. 1, or the processes 610 and 620 of FIGS. 6A and 6B.

As an initial step, the weight extraction process obtains a first set of input vectors $x_{Fi}=\{x_{F1}, x_{F2}, \ldots x_{Fs}\}$ comprising s input vectors (block 701), which are to be utilized for performing forward pass matrix-vector multiplication operations using the stored weight matrix W in the RPU array. The number of elements of each input vector will depend on the dimensions of the stored weight matrix W. In some embodiments, the first set of input vectors comprises a set of random vectors which are configured to provide a high entropy input. For example, in some embodiments, the set of input vectors comprises a set of linearly independent vectors. The vectors in a given set of input vectors are deemed to be linearly independent vectors if no vector in the given set of input vectors is a linear combination of other vectors in the set of input vectors. By way of example, in some embodiments, the set of input vectors can be obtained from rows of a Hadamard matrix, which is a square matrix having entries of either +1 or −1, wherein the rows of the Hadamard matrix are mutually orthogonal (i.e., all rows are orthogonal to each other and are therefore linearly independent). In some embodiments, the number s of input vectors that are utilized for the weight extraction process will vary depending on, e.g., the size of the stored weight matrix W. For example, assuming that the weight matrix W has matrix size of m×n, the number of input vectors s can be on the order of 10×n or greater, or 10×m or greater.

Furthermore, as noted above, to enable computation of forward pass offset correction parameters, each input vector $x_{Fi}=\{x_{F1}, x_{F2}, \ldots x_{Fs}\}$ will have an additional element of value "1" added to the input vector, which is applied to a dummy row or dummy column of the RPU array, depending on how the RPU array is configured for forward pass operations (e.g., whether the input vectors are input to the columns or rows of the RPU array). As further noted above, in some embodiments, the dummy row or dummy column will be initially encoded with weight values of "0".

The weight extraction process sequentially inputs each input vector $x_{Fi}$ to the RPU system to perform forward pass matrix-vector multiplication by multiplying the weight matrix W stored in the RPU array by each input vector $x_{Fi}$ to obtain a first set of output vectors (block 702). More specifically, as noted above, the matrix-vector multiplication operations in the forward direction, i.e., $Y_{Fi}=Wx_{Fi}$, result in a set of vector pairs, $$\{x_{Fi}, y_{Fi}\}_{i=1}^{S},$$

comprising s pairs of vectors $x_{Fi}$ and $y_{Fi}$. The weight extraction process performs a computation using the set of vector pairs, $$\{x_{Fi}, y_{Fi}\}_{i=1}^{S}$$

to determine an effective forward weight matrix $W_F$ (block 703). For example, in some embodiments, as discussed above in conjunction with FIG. 6A, the forward weight determination process 610 computes the effective forward weight matrix $W_F$ using a multivariate optimization process, e.g., Eqn. 1.

In some embodiments, the inverse matrix $$(X_F X_F^T)^{-1}$$

of Eqn. 1 can be computed in the digital domain using any suitable matrix inversion process to compute an estimate of the inverse matrix, For example, in some embodiments, the matrix inversion process is implemented using a Neuman series process and/or a Newton iteration process to compute an approximation of the inverse matrix $$(X_F X_F^T)^{-1},$$

which exemplary methods are known to those of ordinary skill in the art. In some embodiments, the matrix inversion process is performed using the hardware acceleration computing techniques as disclosed in U.S. patent application Ser. No. 17/134,814, filed on Dec. 28, 2020, entitled: Matrix Inversion Using Analog Resistive Crossbar Array hardware, which is commonly assigned and fully incorporated herein by reference.

After computing the effective forward weight matrix $W_F$, the weight extraction process will determine a set of offset correction parameters $O_F$ for forward pass matrix-vector multiplication operations based on the effective forward weight values of the weights in the dummy column (or row)

of the forward weight matrix $W_F$ (block 704). As noted above, the weight values of the weights in the dummy column (or row) of the forward weight matrix $W_F$ would represent the respective bias terms bF (offsets value) of the respective rows (or columns) of the RPU array. The offset correction parameters $O_F$ for the forward pass operation would have values that are determined to negate the respective bias terms $b_F$ to thereby ensure that offset errors for the forward pass operations would be corrected to "0" (e.g., $O_F+b_F=0$).

Following completion of the forward pass matrix-vector multiplication operations (in block 702), the weight extraction process proceeds to obtain a second set of input vectors $x_{Bi}=\{x_{B1}, x_{B2}, \ldots x_{Bs}\}$ comprising s input vectors (block 705), which are to be utilized for performing backward pass matrix-vector multiplication operations using the stored transpose $W^T$ of the weight matrix W in the RPU array. The number of elements of each input vector $x_{Bi}$ will depend on the dimensions of the stored weight matrix W. In some embodiments, assuming the stored weight matrix W is a square matrix, the second set of input vectors be the same first set of input vectors used for the forward pass matrix-vector multiplication operations. In other embodiments, the second set of input vectors comprises a set of random vectors which are configured to provide a high entropy input. For example, in some embodiments, the set of input vectors comprises a set of linearly independent vectors, which can be obtained from rows of a Hadamard matrix. As noted above, the number s of input vectors that are utilized for the weight extraction process will vary depending on, e.g., the size of the stored weight matrix W. For example, assuming that the weight matrix W has matrix size of m×n, the second set of input vector can have a number of input vectors s on the order of 10×n or greater, or 10×m or greater.

Furthermore, as noted above, to enable computation of backward pass offset correction parameters, each input vector $x_{Bi}=\{x_{B1}, x_{B2}, \ldots x_{Bs}\}$ will have an additional element of value "1" added to the input vector, which is applied to a dummy row or dummy column of the RPU array, depending on how the RPU array is configured for backward pass operations (e.g., whether the input vectors are input to the columns or rows of the RPU array). As further noted above, in some embodiments, the dummy row or dummy column will be initially encoded with weight values of "0".

The weight extraction process sequentially inputs each input vector $x_{Bi}$ to the RPU system to perform backward pass matrix-vector multiplication by multiplying the transpose $W^T$ of the weight matrix W stored in the RPU array by each input vector $x_{Bi}$ to obtain a second set of output vectors (block 706). More specifically, as noted above, the matrix-vector multiplication operations in the backward direction, i.e., $y_{Bi}=W^Tx_{Bi}$, result in a set of vector pairs, $$\{x_{Bi}, y_{Bi}\}_{i=1}^{S},$$

comprising s pairs of vectors $x_{Bi}$ and $y_{Bi}$. The weight extraction process performs a computation using the set of vector pairs, $$\{x_{Bi}, y_{Bi}\}_{i=1}^{S}$$

to determine an effective backward weight matrix $W_B$ (block 707). For example, in some embodiments, as discussed above in conjunction with FIG. 6B, the backward weight determination process 620 computes the effective backward weight matrix $W_B$ using a multivariate optimization process, e.g., Eqn. 2.

After computing the effective backward weight matrix $W_B$, the weight extraction process will determine a set of offset correction parameters $O_B$ for backward pass matrix-vector multiplication operations based on the effective backward weight values of the weights in the dummy row (or column) of the backward weight matrix $W_B$ (block 708). As noted above, the weight values of the weights in the dummy row (or column) of the backward weight matrix $W_B$ would represent the respective bias terms $b_B$ (offsets value) of the respective columns (or rows) of the RPU array. The offset correction parameters $O_B$ for the backward pass operation would have values that are determined to negate the respective bias terms $b_B$ to thereby ensure that offset errors for the backward pass operations would be corrected to "0" (e.g., $O_F+b_F=0$).

After computing the effective forward and backward weight matrices $W_F$ and $W_B$, the autocalibration process 130 performs an optimization computation (e.g., Eqn. 3) using the effective forward and backward weight matrices $W_F$ and $W_B$ to determine (i) a set of scaling correction parameters $S_F$ for forward pass matrix-vector multiplication operations performed by the RPU array, and (ii) a set of scaling correction parameters $S_B$ for backward pass matrix-vector multiplication operations performed by the RPU array (block 709). The autocalibration process 130 will then configure the RPU system to enable the RPU to apply the determined offset correction parameters and the scaling correction parameter to forward pass and backward pass matrix-vector multiplication operation performed by the RPU array (block 710).

In some embodiments, the RPU system is configured to apply the offset correction parameters and the scaling correction parameters to the output vectors that are generated as a result of the forward and backward pass matrix-vector multiplication operations. For example, in some embodiments, the artificial neurons, which process the output vectors generated by the RPU array for forward pass and back operations, are configured to apply the offset and scaling correction parameters to the output vectors before performing, e.g., NLF operations. In other embodiments, the RPU system is configured (i) to apply the offset and scaling correction parameters for the forward pass operation to the input vectors before performing a forward pass matrix-vector multiplication operation, and (ii) to apply the offset and scaling correction parameters for the backward pass operation to the input error vectors before performing a backward pass matrix-vector multiplication operation.

In some embodiments where the RPU system comprises noise and bound management circuitry as described above, the autocalibration process can configure the noise and bound management circuitry to apply the offset correction parameters and the scaling correction parameters to the input vectors or output vectors for calibrating the forward and backward pass matrix-vector multiplication operations. In such embodiments, the offset correction parameters and the scaling correction parameters are applied to the input vectors or output vectors in addition to the dynamic scaling up and scaling down that is performed by noise and bound management circuitry as described above to overcome noise and signal bound issues.

Figure 8:
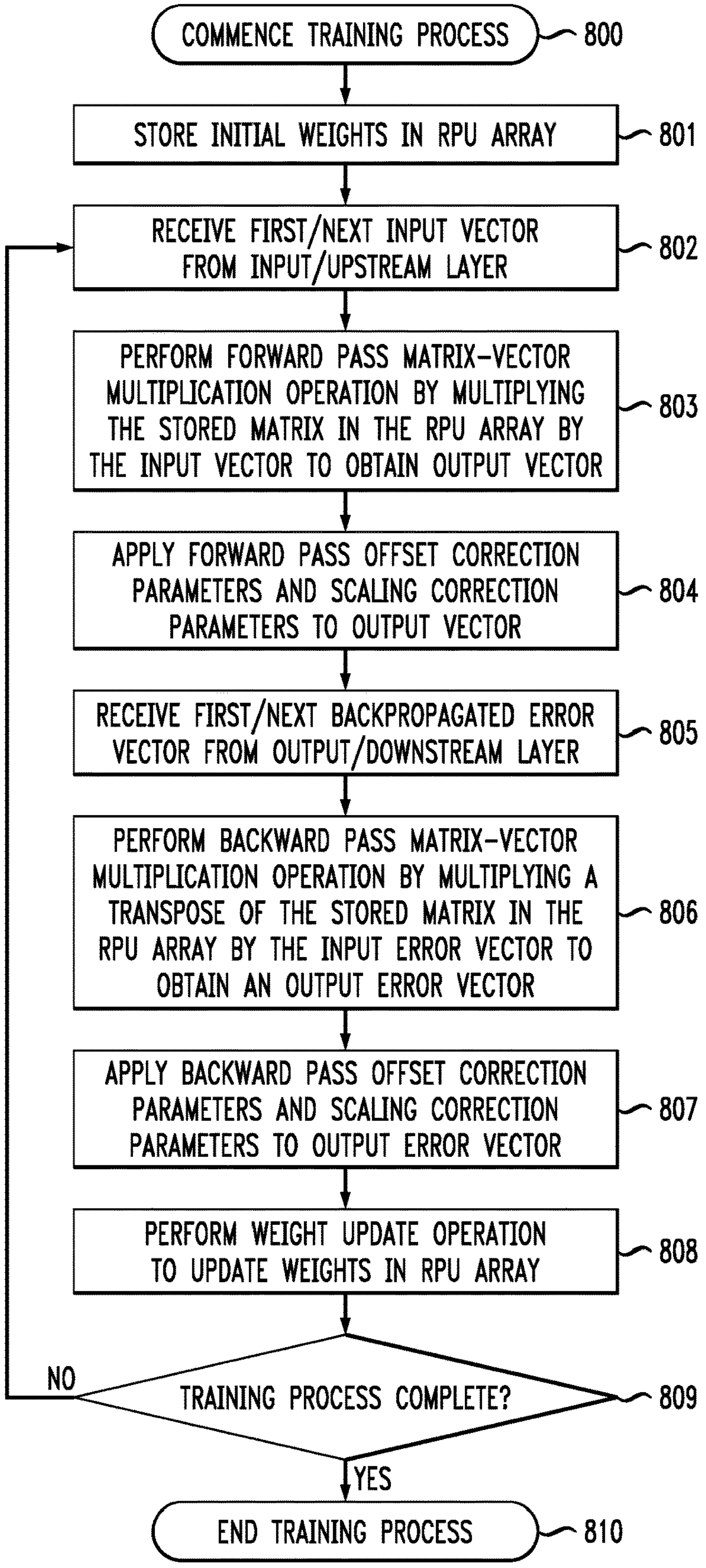
FIG. 8 illustrates a flow diagram of a method for calibrating matrix-vector multiplication operations for training an artificial neural network training process on resistive processing unit hardware, according to an exemplary embodiment of the disclosure.

FIG. 8 illustrates a flow diagram of a method for calibrating matrix-vector multiplication operations for training an artificial neural network training process on RPU hardware, according to an exemplary embodiment of the disclosure. More specifically, FIG. 8 illustrates a method for training an artificial neural network on an RPU system wherein it is assumed that the RPU system has been configured to implement an architecture (e.g., neural network layers, and synaptic arrays to connect the layers, etc.) for a given artificial neural network to be trained using one or more RPU arrays of synaptic weight and layers of artificial neurons. In some embodiments, as noted above, the artificial neural network configuration process 136 executed by the digital processing system 110 (FIG. 1) includes methods for configuring the neuromorphic computing system 120 (e.g., RPU system) to perform hardware accelerated computation operations that will be needed to perform a model training process (e.g., the backpropagation process.

For example, in some embodiments, the digital processing system 110 communicates with a programming interface of the neuromorphic computing system 120 to configure one or more artificial neurons and a routing system of the neuromorphic computing system 120 to allocate and configure one or more neural cores to (i) implement one or more interconnected RPU arrays for storing initial weight matrices and to (ii) perform in-memory computations (e.g., matrix-vector computations, outer product computations, etc.) needed to implement the training process and weight extraction process. In some embodiments, the number of RPU arrays that are allocated and interconnected to configure the artificial synapses of the artificial neural network will vary depending on, e.g., the number of neural network layers (which can be 10 or more layers for deep neural networks), the number and sizes of the synaptic weight arrays that are needed for connecting the neural network layers, the size of the RPU arrays, etc. For example, if each RPU array has a size of 4096×4096, then one RPU array can be configured to store the values of a given m×n weight matrix W, where m and n are 4096 or less. In some embodiments, when the given m×n weight matrix W is smaller than the physical RPU on which the given m×n weight matrix W is stored, any unused RPU cells can be set to zero and/or unused inputs to the RPU array can be padded by "zero" voltages. In some embodiments, when the size of the given m×n weight matrix W is greater than the size of a single RPU array, then multiple RPU arrays can be operatively interconnected to form a synaptic weight array which is large enough to store the values of the given m×n weight matrix W.

Furthermore, in some embodiments, the autocalibration process 130 is configured to operate in conjunction with the artificial neural network configuration process 136 to configure the RPU system to apply the offset correction parameters and the scaling correction parameters, which were computed by the autocalibration process 130. For example, as noted above, in some embodiments, the artificial neurons of the neural network layers can be configured to apply the offset correction parameters and the scaling correction parameters to input vectors prior to performing forward pass or backward pass matrix-vector multiplication operations. In some embodiments, the artificial neurons of the neural network layers can be configured to apply the offset correction parameters and the scaling correction parameters to output vectors that are generated as a result of performing forward pass or backward pass matrix-vector multiplication operations. In some embodiments, the noise and bound management circuitry of the RPU arrays can be configured to apply the offset correction parameters and the scaling correction parameters to input or output vectors that are processed or generated by the RPU arrays.

Following the initial configuration of the RPU system to implement the architecture of the artificial neural network to be trained, the digital processing system 110 invokes the artificial neural network training process 138 to commence a training process (block 800). For ease of discussion, the process flow of FIG. 8 will be discussed in the context of operations that are performed on a given synaptic weight matrix which is stored in a given RPU array (or RPU tile) and which provides weighted connections between artificial neurons (e.g., pre-synaptic neurons and post-synaptic neurons) of two different layers of the artificial neural network (e.g., input layer and first hidden layer). It is to be understood that the same process flow would be applied for all synaptic weight matrices disposed between all artificial network layers (e.g., input layer, hidden intermediate layer (s), output layer) of the artificial neural network implemented by the RPU system.

An initial step of the training process involves storing initial synaptic weight values in the RPU array (block 801). In addition, the digital processing system 110 of computing system 100 obtains a set of training data, such as a MNIST (Modified National Institute of Standards and Technology) dataset, for use in training the artificial neural network. The set of training data is converted to a set of input vectors that are applied to the input layer of the artificial neural network. As part of the training process, an input vector would be applied to the input layer of the neural network and then propagated through the neural network as part of a forward pass iteration. In this process, the input vectors to a given synaptic weight matrix in the RPU array would represent the input activity of the specific layer connected to the input of the synaptic weight matrix.

During a given forward pass iteration of the training process, an input vector x received from an upstream layer (e.g., input layer) would be input the RPU array which stores the given synaptic weight matrix W (block 802), and a forward pass matrix-vector multiplication operation is performed by multiplying the synaptic weight matrix W stored in the given RPU array by the input vector x to generate a resulting output vector y=Wx (block 803). In some embodiments, the calibration parameters for the forward pass matrix-vector multiplication operation are applied to the output vector y (block 804).

More specifically, in some embodiments, the forward pass matrix-vector multiplication operation is calibrated by applying the set of offset correction parameters $O_F$ (computed for the given RPU array) to the respective element values of the output vector $y=[y_1, y_2, \ldots, y_m]$, followed by applying the set of scaling correction parameters $S_F$ to the offset-corrected element values of the output vector y. By way of example, referring to the exemplary embodiment of FIG. 4A, the set of offset correction parameters $O_F$ would comprise m offset correction parameters, e.g., $O_F=\{O_{F1}, O_{F2}, \ldots, O_{Fm}\}$, one for each row R1, R2, . . . $R_m$. In addition, the set of scaling correction parameters SF would comprise m scaling correction parameters, e.g., $S_F=\{S_{F1}, S_{F2}, \ldots, S_{Fm}\}$, one for each row R1, R2, . . . $R_m$. In this instance, to calibrate the forward pass matrix-vector multiplication operation, the values of the output vector elements $y_1, y_2, \ldots, y_m$ would be offset-corrected by adding/subtracting the offset correction parameters $O_{F1}, O_{F2}, \ldots, O_{Fm}$ to/from the respective values of the output vector elements $y_1, y_2, \ldots, y_m$, followed by multiplying the offset-corrected output vector elements $y_1, y_2, \ldots, y_m$ by the respective scaling correction parameters $S_{F1}, S_{F2}, \ldots, S_{Fm}$.

Next, during a given backward pass iteration of the training process, an input error vector $x_{err}$ received from a downstream layer (e.g., output layer, or downstream hidden layer) would be input the RPU array (block 805), and a backward pass matrix-vector multiplication operation is performed by multiplying the transpose $W^T$ of the synaptic weight matrix W stored in the given RPU array by the input error vector $x_{err}$ to generate a resulting output error vector $y_{err}=W^T x_{err}$ (block 806).

In some embodiments, the calibration parameters for the backward pass matrix-vector multiplication operation are applied to the output vector y (block 807). More specifically, in some embodiments, the backward pass matrix-vector multiplication operation is calibrated by applying the set of offset correction parameters $O_B$ (computed for the given RPU array) to the respective element values of the output error vector $y_{err}$, followed by applying the set of scaling correction parameters $S_B$ to the offset-corrected element values of the output error vector $y_{err}$. By way of example, referring to the exemplary embodiment of FIG. 4B, the set of offset correction parameters $O_B$ would comprise n offset correction parameters, e.g., $O_B=\{O_{B1}, O_{B2}, \ldots, O_{Bn}\}$, one for each column C1, C2, . . . $C_n$. In addition, the set of scaling correction parameters $S_B$ would comprise n scaling correction parameters, e.g., $S_B=\{S_{B1}, S_{B2}, \ldots, S_{Bn}\}$, one for each column C1, C2, . . . $C_n$. In this instance, to calibrate the backward pass matrix-vector multiplication operation, the values of the output error vector elements $Y_{err}=y_1, y_2, \ldots, y_n$ would be offset-corrected by adding/subtracting the offset correction parameters $O_{B1}, O_{B2}, \ldots, O_{Bn}$ to/from the respective values of the respective elements $y_1, y_2, \ldots, y_n$ of the output error vector $y_{err}$, followed by multiplying the offset-corrected output error vector elements $y_1, y_2, \ldots, y_n$ by the respective scaling correction parameters $S_{B1}, S_{B2}, \ldots, S_{Bn}$.

Following the forward pass and backward pass operations, a weight update process is performed to update the synaptic weight values of the weight matrix W stored in the RPU array (block 808). As noted above, the weight update process can be implemented by performing an analog vector-vector outer product operation between the input x vector and the input error vector $x_{err}$ that were input to the RPU array for the given iteration of the backpropagation training process, the details of which are known to those of ordinary skill in the art.

The iterative training process (blocks 802-808) is repeated for remaining input vectors associated with the obtained training dataset, until a convergence criterion is met, indicating completion of the training process (block 809). When the training process is complete (affirmative determination in block 809), the training process is terminated (block 810).

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
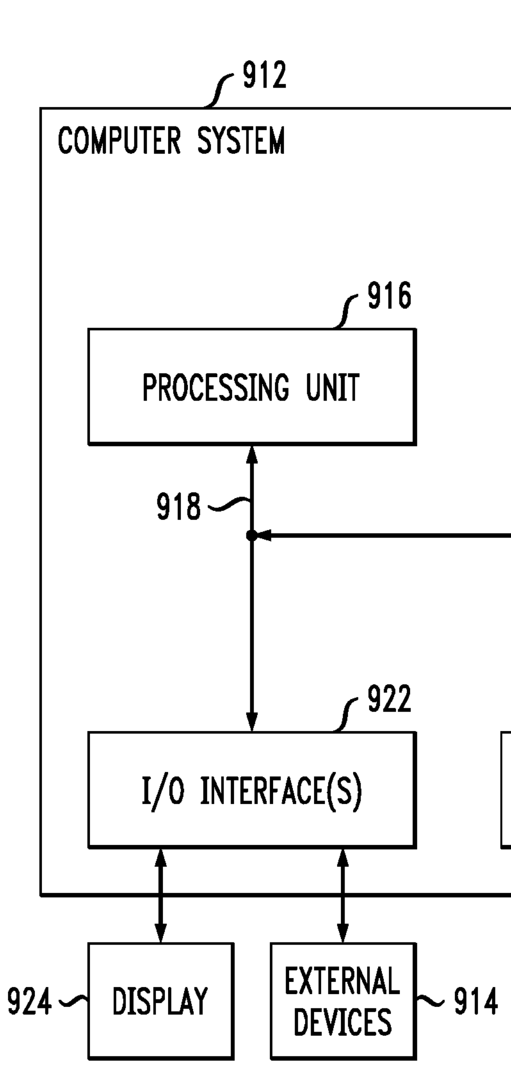
FIG. 9 schematically illustrates an exemplary architecture of a computing node which can host the computing system of FIG. 1, according to an exemplary embodiment of the disclosure.

These concepts are illustrated with reference to FIG. 9, which schematically illustrates an exemplary architecture of a computing node that can host the computing system of FIG. 1, according to an exemplary embodiment of the disclosure. FIG. 9 illustrates a computing node 900 which comprises a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

In FIG. 9, computer system/server 912 in computing node 900 is shown in the form of a general-purpose computing device. The components of computer system/server 912 may include, but are not limited to, one or more processors or processing units 916, a system memory 928, and a bus 918 that couples various system components including system memory 928 to the processors 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random-access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As depicted and described herein, memory 928 may include at least one program product having a set (e.g., at least one) of program modules that are configured to carry out the functions of embodiments of the invention.

The program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the disclosure as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
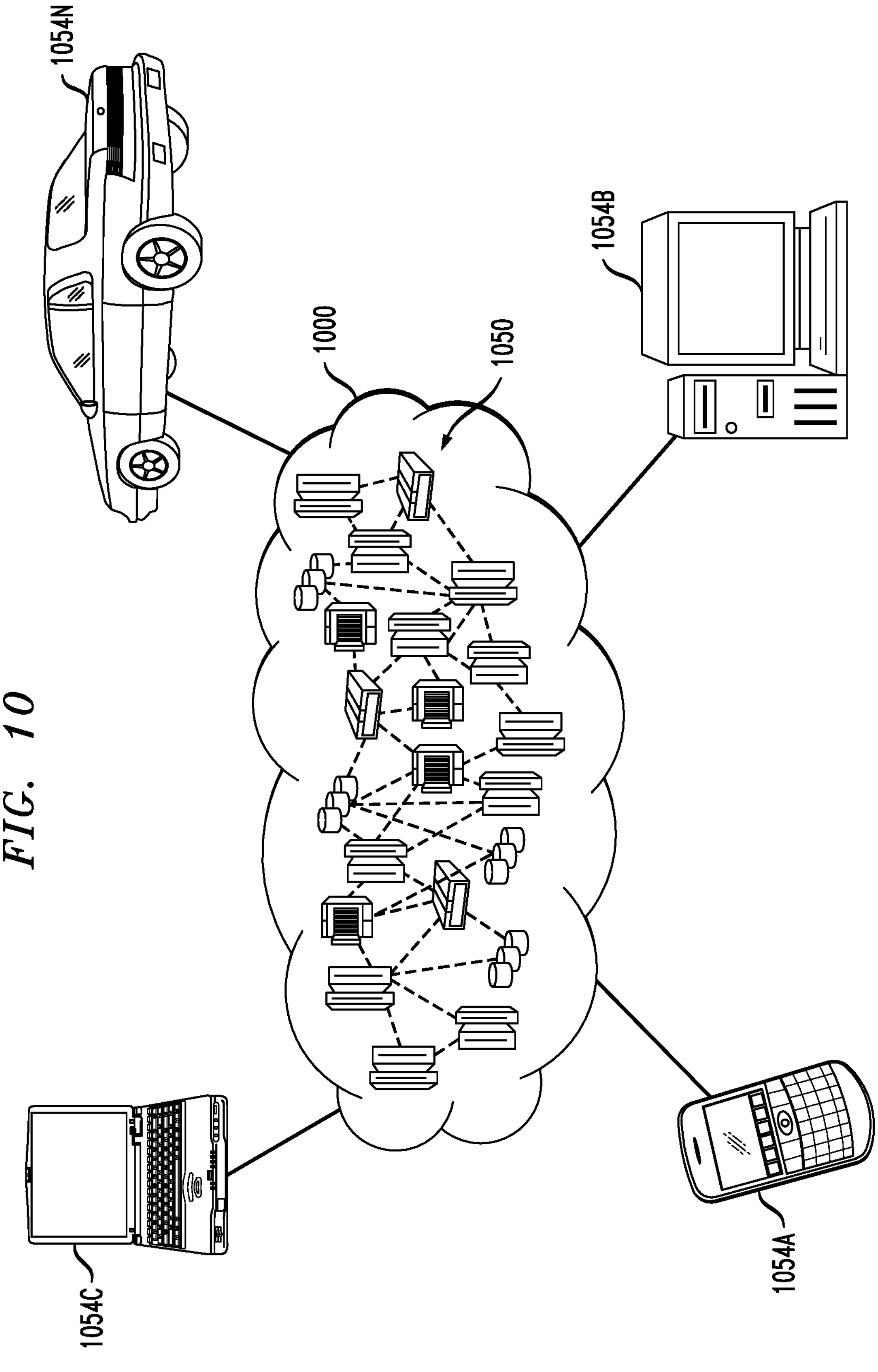
FIG. 10 depicts a cloud computing environment according to an exemplary embodiment of the disclosure.

Referring now to FIG. 10, illustrative cloud computing environment 1000 is depicted. As shown, cloud computing environment 1000 includes one or more cloud computing nodes 1050 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1050 and cloud computing environment 1000 can communicate with any type of computerized device over any type of network and/or network addressable connection (e.g., using a web browser).

Figure 11:
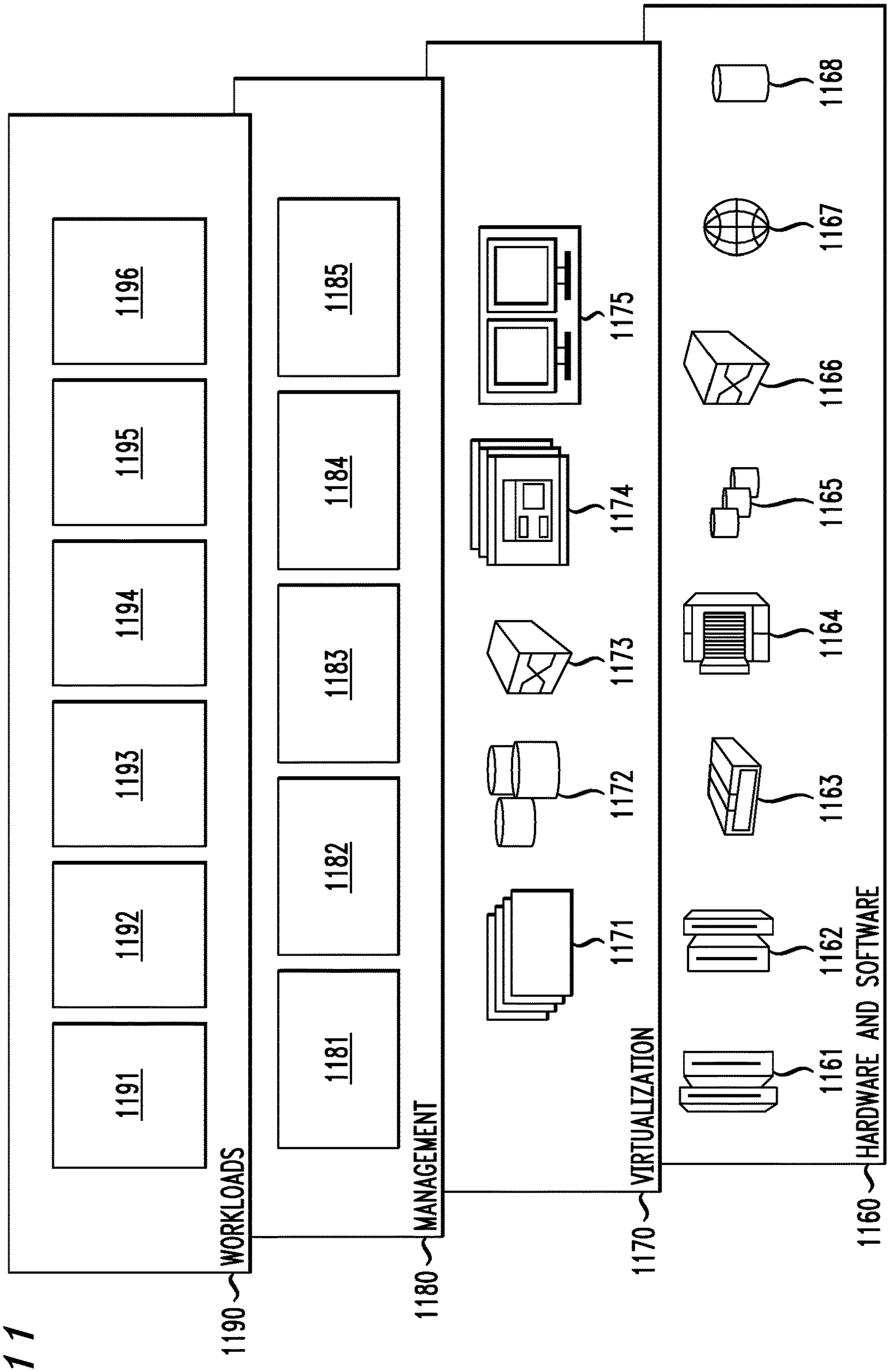
FIG. 11 depicts abstraction model layers according to an exemplary embodiment of the disclosure.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and various functions 1196 for performing hardware accelerated computing and analog in-memory computations using an RPU system with RPU arrays, wherein such computation included, but are not limited to, weight extraction computations, autocalibration operations, matrix-vector multiplication operations, vector-vector outer product operations, neural network training operations, etc., based on the exemplary methods and functions discussed above in conjunction with, e.g., FIGS. 6A, 6B, 6C, 7 and 8. Furthermore, in some embodiments, the hardware and software layer 1160 would include, e.g., the computing system 100 of FIG. 1 to implement or otherwise support the various workloads and functions 1196 for performing such hardware accelerated computing and analog in-memory computations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a digital processing system; and a resistive processing unit (RPU) system coupled to the digital processing system, the RPU system comprising a crossbar array of cells, the cells comprising respective resistive memory devices having respective conductances that are programmable;

wherein the digital processing system is configured to:

control the RPU system to store a matrix in the crossbar array of cells by programming the conductances of at least portion of the resistive memory devices to store weight values of the stored matrix in the crossbar array of cells;

perform a calibration process to determine calibration factors that are configured to compensate for hardware errors of the RPU system when the digital processing system utilizes the RPU system to perform analog matrix-vector multiplication operations using the stored matrix in the crossbar array of cells, wherein in performing the calibration process, the digital processing system is configured to:

generate a first set of calibration parameters for calibrating forward pass matrix-vector multiplication operations performed on the stored matrix in the crossbar array of cells; and generate a second set of calibration parameters for calibrating backward pass matrix-vector multiplication operations performed on a transpose of the stored matrix in the crossbar array of cells;

wherein the first set calibration parameters and the second set of calibration parameters are configured to calibrate respective forward pass and backward pass matrix-vector multiplication operations so that effective weight values of the stored matrix for a given forward pass matrix-vector multiplication operation correspond to effective weight values of the transpose of the stored matrix for a given backward pass matrix-vector multiplication operation;

calibrate forward pass matrix-vector multiplication operations by applying the first set of calibration parameters to input vectors that are applied to the crossbar array of cells to perform forward pass matrix-vector multiplication operations, or to output vectors that are output from the crossbar array of cells after performing forward pass matrix-vector multiplication operations; and calibrate backward pass matrix-vector multiplication operations by applying the second set of calibration parameters to input vectors that are applied to the crossbar array of cells to perform backward pass matrix-vector multiplication operations, or to output vectors that are output from the crossbar array of cells after performing backward pass matrix-vector multiplication operations.

2. The system of claim 1, wherein:

the first set of calibration parameters comprises a first set of offset correction parameters, and a first set of scaling correction parameters; and the second set of calibration parameters comprises a second set of offset correction parameters, and a second set of scaling correction parameters.

3. The system of claim 1, wherein the calibration process is agnostic to an underlying hardware implementation of the RPU system.

4. The system of claim 1, wherein in performing the calibration process, the digital processing system is configured to:

perform a first weight extraction process to extract a first matrix of weight values which are realized by performing forward pass matrix-vector multiplication operations on the stored matrix in the crossbar array of cells of the RPU system;

perform a second weight extraction process to extract a second matrix of weight values which are realized by performing backward pass matrix-vector multiplication operations on the transpose of the stored matrix in the crossbar array of cells of the RPU system; and utilize the extracted first matrix and the extracted second matrix to determine the first set and second set of calibration parameters.

5. The system of claim 4, wherein the digital processing system is configured to:

determine a first set of offset correction parameters based on weight values of one of a dummy row and a dummy column of the extracted first matrix; and determine a second set of offset correction parameters based on weight values of one of a dummy row and a dummy column of the extracted second matrix;

wherein the first set of calibration parameters comprises the first set of offset correction parameters; and wherein the second set of calibration parameters comprises the second set of offset correction parameters.

6. The system of claim 4, wherein:

in performing the first weight extraction process, the digital processing system is configured to:

apply a first set of input vectors to the RPU system to perform forward pass matrix-vector multiplication operations on the stored matrix;

obtain a first set of output vectors resulting from the forward pass matrix-vector multiplication operations; and determine the weight values of the extracted first matrix utilizing the first set of input vectors and the first set of output vectors; and in performing the second weight extraction process, the digital processing system is configured to:

apply a second set of input vectors to the RPU system to perform backward pass matrix-vector multiplication operations on the transpose of the stored matrix;

obtain a second set of output vectors resulting from the backward pass matrix-vector multiplication operations; and determine the weight values of the extracted second matrix utilizing the second set of input vectors and the second set of output vectors.

7. The system of claim 6, wherein:

in determining the weight values of the extracted first matrix, the digital processing system is configured to perform a first multivariate linear regression computation using the first set of input vectors and the resulting first set of output vectors to determine the weight values of extracted first matrix; and in determining the weight values of the extracted second matrix, the digital processing system is configured to perform a second multivariate linear regression computation using the second set of input vectors and the resulting second set of output vectors to determine the weight values of extracted second matrix.

8. The system of claim 7, wherein:

in performing the first multivariate linear regression computation, the digital processing system is configured to:

generate a first matrix which comprises the first set of input vectors;

generate a second matrix which comprises the first set of output vectors;

multiply the first matrix by a transpose of the first matrix to thereby generate a third matrix;

determine an inverse of the third matrix; and multiply the inverse of the third matrix, the first matrix, and a transpose of the second matrix to thereby generate a fourth matrix, wherein a transpose of the fourth matrix comprises the weight values of the extracted first matrix; and in performing the second multivariate linear regression computation, the digital processing system is configured to:

generate a fifth matrix which comprises the second set of input vectors;

generate a sixth matrix which comprises the second set of output vectors;

multiply the fifth matrix by a transpose of the sixth matrix to thereby generate a seventh matrix;

determine an inverse of the seventh matrix; and multiply the inverse of the seventh matrix, the fifth matrix, and a transpose of the sixth matrix to thereby generate an eighth matrix, wherein the eighth matrix comprises the weight values of the extracted second matrix.

9. The system of claim 4, wherein the digital processing system is configured to:

perform an optimization process using the extracted first matrix and the extracted second matrix to determine a first set of scaling correction parameters and a second set of scaling correction parameters;

wherein the first set of calibration parameters comprises the first set of scaling correction parameters; and wherein the second set of calibration parameters comprises the second set of scaling correction parameters.

10. The system of claim 9, wherein in performing the optimization process, the digital processing system is configured to perform an iterative optimization process which comprises:

generating a first scaling matrix which comprises initial values of the first set of scaling correction parameters;

generating a second scaling matrix which comprises initial values the second set of scaling correction parameters;

multiplying the first scaling matrix and the extracted first matrix to generate a first scaled matrix;

multiplying the second scaling matrix and by extracted second matrix to generate a second scaled matrix; and optimizing the values of the first scaling matrix and the second scaling matrix to obtain a convergence condition in which the first scaled matrix minus the second scaled matrix is at a target minimum value.

11. A computer program product, comprising:

one or more non-transitory computer readable storage media, and program instructions collectively stored on the one or more non-transitory computer readable storage media, the program instructions comprising:

program instructions to control a resistive processing unit (RPU) system to store a matrix of weight values in a crossbar array of cells of a resistive processing unit (RPU) system, the cells comprising respective resistive memory devices having respective conductances that are programmable, wherein the matrix of weight values is stored by programming the conductances of at least portion of the resistive memory devices to store the matrix of weight values in the crossbar array of cells;

program instructions to perform a calibration process to determine calibration factors that are configured to compensate for hardware errors of the RPU system when the digital processing system utilizes the RPU system to perform analog matrix-vector multiplication operations using the stored matrix in the crossbar array of cells, wherein the program instructions to perform the calibration process comprise:

program instruction to generate a first set of calibration parameters for calibrating forward pass matrix-vector multiplication operations performed on the stored matrix in the crossbar array of cells of the RPU system; and program instruction to generate a second set of calibration parameters for calibrating backward pass matrix-vector multiplication operations performed on a transpose of the stored matrix in the crossbar array of cells;

wherein the first set and the second set of calibration parameters are configured to calibrate respective forward pass and backward pass matrix-vector multiplication operations so that effective weight values of the stored matrix for a given forward pass matrix-vector multiplication operation correspond to effective weight values of the transpose of the stored matrix for a given backward pass matrix-vector multiplication operation;

program instructions to calibrate forward pass matrix-vector multiplication operations by applying the first set of calibration parameters to input vectors that are applied to the crossbar array of cells to perform forward pass matrix-vector multiplication operations, or to output vectors that are output from the crossbar array of cells after performing forward pass matrix-vector multiplication operations; and program instructions to calibrate backward pass matrix-vector multiplication operations by applying the second set of calibration parameters to input vectors that are applied to the crossbar array of cells to perform backward pass matrix-vector multiplication operations, or to output vectors that are output from the crossbar array of cells after performing backward pass matrix-vector multiplication operations.

12. The computer program product of claim 11, wherein:

the first set of calibration parameters comprises a first set of offset correction parameters, and a first set of scaling correction parameters; and the second set of calibration parameters comprises a second set of offset correction parameters, and a second set of scaling correction parameters.

13. The computer program product of claim 11, wherein the calibration process is agnostic to an underlying hardware implementation of the RPU system.

14. The computer program product of claim 11, wherein the program instructions to perform the calibration process, comprise:

program instructions to perform a first weight extraction process to extract a first matrix of weight values which are realized by performing forward pass matrix-vector multiplication operations on the stored matrix in the crossbar array of cells of the RPU system;

program instructions to perform a second weight extraction process to extract a second matrix of weight values which are realized by performing backward pass matrix-vector multiplication operations on the transpose of the stored matrix in the crossbar array of cells of the RPU system; and program instructions to utilize the extracted first matrix and the extracted second matrix to determine the first set and second set of calibration parameters.

15. The computer program product of claim 14, wherein:

the program instructions to perform the first weight extraction process, comprise:

program instructions to apply a first set of input vectors to the RPU system to perform forward pass matrix-vector multiplication operations on the stored matrix;

program instructions to obtain a first set of output vectors resulting from the forward pass matrix-vector multiplication operations; and program instructions to determine the weight values of the extracted first matrix utilizing the first set of input vectors and the first set of output vectors; and the program instructions to perform the second weight extraction process, comprise:

program instructions to apply a second set of input vectors to the RPU system unit to perform backward pass matrix-vector multiplication operations on the transpose of the stored matrix;

program instructions to obtain a second set of output vectors resulting from the backward pass matrix-vector multiplication operations; and program instructions to determine the weight values of the extracted second matrix utilizing the second set of input vectors and the second set of output vectors.

16. The computer program product of claim 15, wherein:

the program instructions for determining the weight values of the extracted first matrix comprise program instructions to perform a first multivariate linear regression computation using the first set of input vectors and the resulting first set of output vectors to determine the weight values of extracted first matrix; and the program instructions for determining the weight values of the extracted second matrix, comprise program instructions to perform a second multivariate linear regression computation using the second set of input vectors and the resulting second set of output vectors to determine the weight values of extracted second matrix.

17. The computer program product of claim 16, wherein:

the program instructions for performing the first multivariate linear regression computation, comprise:

program instructions to generate a first matrix which comprises the first set of input vectors;

program instructions to generate a second matrix which comprises the first set of output vectors;

program instructions to multiply the first matrix by a transpose of the first matrix to thereby generate a third matrix;

program instructions to determine an inverse of the third matrix; and program instructions to multiply the inverse of the third matrix, the first matrix, and a transpose of the second matrix to thereby generate a fourth matrix, wherein a transpose of the fourth matrix comprises the weight values of the extracted first matrix; and wherein the program instructions for performing the second multivariate linear regression computation, comprises:

program instructions to generate a fifth matrix which comprises the second set of input vectors;

program instructions to generate a sixth matrix which comprises the second set of output vectors;

program instructions to multiply the fifth matrix by a transpose of the sixth matrix to thereby generate a seventh matrix;

program instructions to determine an inverse of the seventh matrix; and program instructions to multiply the inverse of the seventh matrix, the fifth matrix, and a transpose of the sixth matrix to thereby generate an eighth matrix, wherein the eighth matrix comprises the weight values of the extracted second matrix.

18. The computer program product of claim 14, further comprising:

program instructions to determine a first set of offset correction parameters based on weight values of one of a dummy row and a dummy column of the extracted first matrix; and program instructions to determine a second set of offset correction parameters based on weight values of one of a dummy row and a dummy column of the extracted second matrix;

wherein the first set of calibration parameters comprises the first set of offset correction parameters; and wherein the second set of calibration parameters comprises the second set of offset correction parameters.

19. The computer program product of claim 14, further comprising:

program instructions to perform an optimization process using the extracted first matrix and the extracted second matrix to determine a first set of scaling correction parameters and a second set of scaling correction parameters;

wherein the first set of calibration parameters comprises the first set of scaling correction parameters; and wherein the second set of calibration parameters comprises the second set of scaling correction parameters.

20. The computer program product of claim 19, wherein the program instruction to perform the optimization process, comprise program instructions to perform an iterative optimization process which comprises:

generating a first scaling matrix which comprises initial values of the first set of scaling correction parameters;

generating a second scaling matrix which comprises initial values the second set of scaling correction parameters;

multiplying the first scaling matrix and the extracted first matrix to generate a first scaled matrix;

multiplying the second scaling matrix and by extracted second matrix to generate a second scaled matrix; and optimizing the values of the first scaling matrix and the second scaling matrix to obtain a convergence condition in which the first scaled matrix minus the second scaled matrix is at a target minimum value.

* * * * *